(12) United States Patent
Hageman et al.

(10) Patent No.: US 10,689,830 B2
(45) Date of Patent: Jun. 23, 2020

(54) CONTAINER ANGLE SENSING USING VISION SENSOR FOR FEEDBACK LOOP CONTROL

(71) Applicant: Deere & Company, Moline, IL (US)

(72) Inventors: John M. Hageman, Dubuque, IA (US); Tarik Loukili, Johnston, IA (US); Suraj Amatya, Clive, IA (US)

(73) Assignee: Deere & Company, Moline, IL (US)

( * ) Notice: Subject to any disclaimer, the term of this patent is extended or adjusted under 35 U.S.C. 154(b) by 67 days.

(21) Appl. No.: 16/055,495

(22) Filed: Aug. 6, 2018

(65) Prior Publication Data
US 2020/0040555 A1 Feb. 6, 2020

(51) Int. Cl.
| E02F 9/26 | (2006.01) |
| E02F 3/32 | (2006.01) |
| G01C 9/06 | (2006.01) |
| G01F 22/00 | (2006.01) |
| E02F 3/64 | (2006.01) |

(52) U.S. Cl.
CPC .................. *E02F 9/26* (2013.01); *G01C 9/06* (2013.01); *G01F 22/00* (2013.01); *E02F 3/32* (2013.01); *E02F 3/6454* (2013.01)

(58) Field of Classification Search
CPC ...... E02F 9/26; E02F 3/32; G01C 9/06; G01F 22/00
See application file for complete search history.

(56) References Cited

U.S. PATENT DOCUMENTS

| 7,669,354 B2 | 3/2010 | Aebischer et al. |
| 2008/0005938 A1* | 1/2008 | Aebischer ............... E02F 9/264 37/413 |

(Continued)

FOREIGN PATENT DOCUMENTS

WO 2016159839 A1 10/2016

OTHER PUBLICATIONS

Mulligan et al., "A Model-Based Vision System for Manipulator Position Sensing", 1989, 10 pages.

(Continued)

*Primary Examiner* — Mark A Connolly
(74) *Attorney, Agent, or Firm* — Joseph R. Kelly; Kelly, Holt & Christenson PLLC

(57) ABSTRACT

A mobile work machine includes a frame and a ground engaging element movably supported by the frame and driven by an engine to drive movement of the mobile work machine. The mobile work machine also includes a container movably supported by the frame and an actuator configured to controllably drive movement of the container relative to the frame. The work machine also includes a control system configured to generate an actuator control signal, indicative of a commanded movement of the actuator, and provide the actuator control signal to the actuator to control the actuator to perform the commanded movement and an image sensor coupled to the mobile work machine, the image sensor being configured to capture an image of the container. The work machine also includes an angle determination system, communicatively coupled to the control system, configured to determine an angle of the container relative to the image sensor, based on the image of the container.

12 Claims, 18 Drawing Sheets

(56) References Cited

U.S. PATENT DOCUMENTS

| | | | |
|---|---|---|---|
| 2008/0162004 A1* | 7/2008 | Price | E02F 3/434 |
| | | | 701/50 |
| 2017/0328030 A1* | 11/2017 | Yamada | E02F 9/2041 |
| 2018/0120098 A1* | 5/2018 | Matsuo | E02F 9/26 |
| 2018/0340316 A1* | 11/2018 | Izumikawa | E02F 9/26 |

OTHER PUBLICATIONS

U.S. Appl. No. 15/657,552, filed Jul. 24, 2017, Application and Drawings. 48 pages.

* cited by examiner

CONTAINER ANGLE SENSING USING VISION SENSOR FOR FEEDBACK LOOP CONTROL

FIELD OF THE DESCRIPTION

The present disclosure relates generally to devices for use in earth-moving operations. More specifically, but not by way of limitation, this disclosure relates to estimating the angle of a container of a work vehicle.

BACKGROUND

Operating a work vehicle, such as an excavator or a scraper, is a highly personal skill. Efficiency (e.g., the amount of earth moved by the work vehicle over an amount of time or per unit of fuel consumed, etc.) is one way to measure at least part of that skill. Efficiency is also one way to measure the performance of the particular machine. However, measuring efficiency, with accuracy and without interjecting an additional step on moving the earth is difficult. For instance, in order to weigh the contents of the bucket of an excavator, the bucket needs to be positioned or moved in a predefined way so the weight can be accurately sensed. This interjects additional steps that may cause the overall earth-moving process to be less efficient. Further, systems that are used to determine the amount of contents in the bucket without physical contact with the bucket may not accurately estimate the volume of the contents.

The discussion above is merely provided for general background information and is not intended to be used as an aid in determining the scope of the claimed subject matter.

SUMMARY

A mobile work machine includes a frame and a ground engaging element movably supported by the frame and driven by an engine to drive movement of the mobile work machine. The mobile work machine also includes a container movably supported by the frame and an actuator configured to controllably drive movement of the container relative to the frame. The work machine also includes a control system configured to generate an actuator control signal, indicative of a commanded movement of the actuator, and provide the actuator control signal to the actuator to control the actuator to perform the commanded movement and an image sensor coupled to the mobile work machine, the image sensor being configured to capture an image of the container. The work machine also includes an angle determination system, communicatively coupled to the control system, configured to determine an angle of the container relative to the image sensor, based on the image of the container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
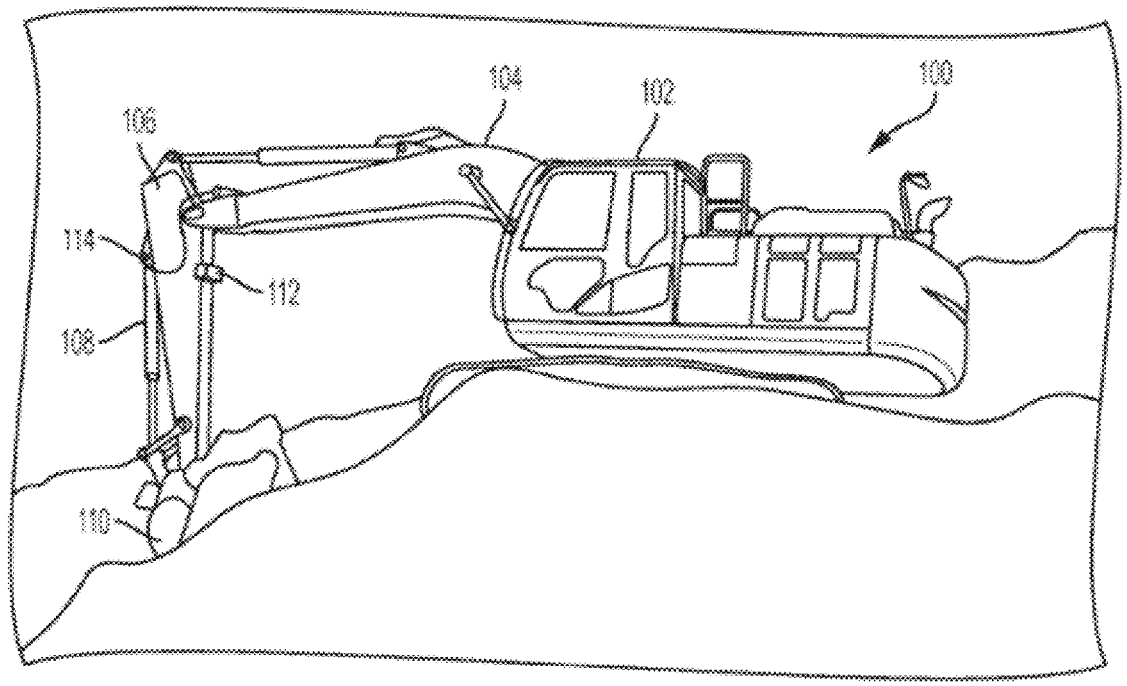
FIG. 1 is a perspective view of a work vehicle that is an excavator with a volume estimation system according to one example of the present disclosure.

Certain aspects and features of the present disclosure relate to estimating a volume of material (e.g. earth) in a container of a work vehicle, such as an excavator, front loader, a scraper, below-ground mining equipment, or other type of machine, using a non-contact measurement system. The system can include a 3D sensor, such as a stereo camera (which may be referred to as a stereoscopic camera) or a laser scanner, and an angle sensor or an angle determination system. The 3D sensor can capture images of the contents of the container. The images can be converted to a 3D point cloud using angles measured from the angle sensor or angles received from the angle determination system. The 3D point cloud can be compared to a known point cloud, mathematical model, or CAD model representing the container and different volumes of contents to determine the volume of content in the container. Additionally or alternatively, the angle data from the angle sensor or the angle determination system can be used for camera and container alignment.

The productivity of material moved by a work vehicle or a group of work vehicles at a work site can be monitored. Visual sensors, such as 3D sensors or laser sensors, can be used to improve volume estimation accuracy and ease. Costs and inconvenience can be reduced, as compared to other volume estimation solutions, such as position sensors and weighting sensors. Further by utilizing an angle determination system the costs and inconvenience of having an additional angle sensor can be reduced. This is because the angle determination system may utilize the same visual sensor that is used in the volume estimation system to determine the angle of the container, in place of the angle sensor. Alternatively, the angle determination system may work in conjunction with an angle sensor to determine whether the angle sensor is malfunctioning and/or is in need of replacement.

In one example, a volume estimation system includes a stereo camera mounted to the arm of an excavator that has a bucket that is within the field of view of the stereo camera. Another sensor, such as a cylinder position sensor or an inertial measurement unit (IMU) sensor, can be used to determine the angle of the bucket relative to the arm. The system can create a model of the bucket and understand how the bucket rotates with respect to the arm. The stereo camera can be used to create a 3D point cloud of objects in the field of view of the stereo camera. The system can determine which surface is above the bucket that is likely to be soil. The surface of the soil can be compared to the model of the bucket and its rotation angle to determine the amount of material in the bucket and produce a volume estimation measurement substantially contemporaneously with the bucket moving the soil. Other logic can determine whether there are individual scoops of material and the system can attempt to use as many relevant measurements during the dig cycle to produce the most accurate volume measurement per scoop as possible. The data, along with other metrics, can be displayed to the excavator operator or streamed to a cloud service, such as JDLink™, for an owner or manager to view.

The volume of a material can be estimated using various processes. One process can include measuring 3D points that represent the surface of material carried by the container of a work vehicle using a sensor that does not contact the container or the material in the container. In some examples, the surface of the material can be extrapolated when the material is unobservable by the non-contact sensor by measuring an angle of repose of the material. The 3D points may also include other surfaces both within the carrier and the surrounding environment that is within the field of view of the sensor. The position and orientation of the container relative to the sensor can be measured. The 3D points that correspond to the material carried by the container can be determined and the 3D points that correspond to the container itself can be determined. The 3D points that do not correspond to material carried by the container or the container itself can be filtered out. For example, 3D points representing dust or other airborne obscurerants can be filtered out. The volume of material can be calculated using the 3D points corresponding to the material carried by the carrier using (i) the orientation or location of the carrier relative to the sensor and (ii) a 3D shape of the carrier. For example, the volume can be calculated as a difference from a reference surface that represents a known volume.

A system according to some examples can include additional features. For example, visual tracking can be used to identify swing state and other motion of the work vehicle. The surfaces of both the material within the container and the surrounding material surfaces in the environment can be determined and compared. Other sensor inputs, such as position, speed, and pressure, from sensors on the work vehicle can also be used.

The sensor can be a stereo camera mounted on a stick, boom, or chassis of an excavator. The stereo camera can stereoscopically capture the 3D points. In other examples, the sensor can be a different type of sensor (e.g., a fixed, scanning, or flash laser mounted on the work vehicle) that can use time-of-flight principles to capture the 3D points.

The system can differentiate between the material carried by the container and other material or objects using the appearance (such as from color data) and the location of the 3D points. Filtering out non-container and non-carried material can use both a depth image of the field of view and the appearance of the images captured by the stereo camera. The geometry of the shape of the container can be modeled. One process to model the shape of the carrier includes measuring by the sensor the 3D points that correspond to the container when the container is empty—i.e., there is no material in the container—such as through a calibration process. The 3D points are filtered to determine the boundaries of the container. A mathematical representation of the container is generated by processing the measured 3D points. Segments of the 3D points corresponding to various geometric components of the container are generated. Examples of segments include a back plate, side sheets, an inner surface and teeth, for a container that is a bucket. The model can also be generated using a 3D CAD drawing of the container. Each of the geometric components of the container can be determined by the appearance and relative position and orientation with reference to the sensor, of the respective geometric component. The geometry of the shape of the container can be modeled from an onboard or off-board storage device.

In some examples, a plane (e.g., a strike plane) that corresponds to the top surface of the container can be defined and updated as the container moves. A closed boundary representing the perimeter of the container can be defined in the plane and updated as the container moves. The volume within the closed boundary that is on the plane and the measured 3D points can be calculated. The closed boundary on the plane can be defined by an operator using one or more images of the container. A planar grid that includes cells of known surface area within the closed boundary on the plane can be defined. The 3D points can be projected onto the grid to increase computational efficiency. The distance between a 3D point corresponding to the material in the container and a 3D point corresponding to the mathematical model of an inner surface of the implement can be measured. The distances that fall within the defined boundary of the container can be summed. The sum of the distances can be multiplied by the area represented by each cell on the grid.

Accuracy and stability of a volume measurement of material carried in a container can be further increased. For example, the consistency of multiple consecutive measurements can be computed. The moving average of volume estimations can be computed. A filter can be applied to instantaneous volume measurements. The model of the container can be updated using a rotation angle measured by an encoder that is combined with measurements from the stereo camera or when the container is occluded from the stereo camera.

In some examples, the performance of the work vehicle operator can be measured by recording the total volume of the material moved throughout the operation and generating a histogram of the measured volume of the material. In addition or alternatively, volume estimation metrics and visualizations can be displayed as one or more of (i) a 3D point cloud of the container, material, and the surrounding environment, (ii) images from the stereo camera, or (iii) metrics, such as volume estimation, variance, totals, container position, container velocity, etc.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a perspective view of a work vehicle that is an excavator 100 with a volume estimation system according to one example of the present disclosure. The excavator 100 includes a cab 102, a boom 104, a stick 106, a hydraulic cylinder 108, and a bucket 110 or other type of container, among other components. The bucket 110 can be used to move earth or other items from one location to another and can be rotationally controlled by the hydraulic cylinder 108 and positionally controlled by the boom 104 and stick 106. The cab 102 can house an operator and includes controls for controlling the other components of the excavator 100.

The volume estimation system can include a 3D sensor, such as a stereo camera 112, a computing device (not shown), and an angle sensor 114. The stereo camera 112 is positioned on the stick 106 in FIG. 1, but in other examples, the stereo camera 112 can be positioned on other components of the excavator 100, such as the boom 104. The stereo camera 112 can be positioned a distance up the stick 106 to obtained a desired field of view of the stereo camera 112. The further up the stick 106 the camera is positioned, the wider its field of view will be. The angle sensor 114 can be positioned on or near the hydraulic cylinder 108. As is described below, angle determination system 2100 can be used along with or instead of angle sensor 114.

The stereo camera 112 can capture images of the bucket 110 for continuously monitoring the volume of material in the bucket 110. The images can be used with information from the angle sensor 114 or an angle determination system and knowledge about the size of the bucket 110, to determine a volume of the contents in the bucket at any particular time. For example, the computing device (not shown) can be positioned in any suitable location within the excavator 100, such as within the cab 102, or remotely from the excavator 100. The computing device can receive the signals from the stereo camera 112 and the angle sensor 114 or the angle determination system, and determine the volume of the contents of the bucket 110 as the contents, such as earth, is moved from one location to another. The signals can include multiple images of the bucket 110 and one or more angles associated with the images. The computing device can use data represented by the signals to determine the volume of the contents in the bucket. The volume of the contents can be used to monitor or measure an efficiency of the operator of the excavator 100, or of the excavator 100 itself. In some examples, a display device is mounted in the cab 102 or in a remote location to display data about the volume of contents in the bucket 110.

Figure 2:
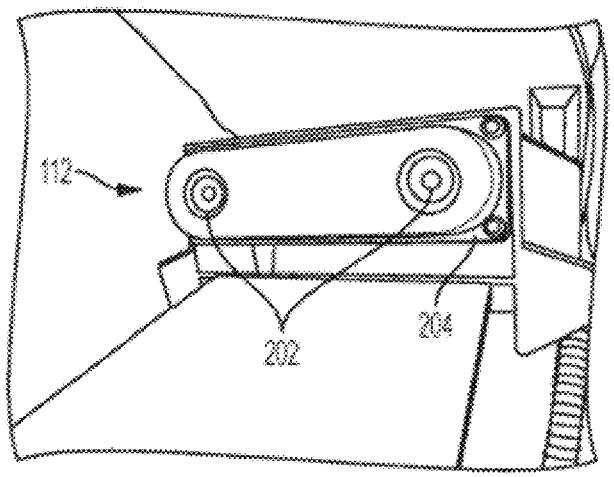
FIG. 2 is a perspective view of the stereo camera from FIG. 1 according to one example of the present disclosure.

FIG. 2 is a perspective view of one example of the stereo camera 112 from FIG. 1. The stereo camera 112 includes two lenses 202 that are separate image sensors spaced apart from each other and have a known spatial relationship with respect to one another. The arrangement can simulate binocular vision to capture 3D images. The lenses 202 are mounted in a housing 204 that can include one or more mounting devices (e.g., holes, clips, or clamps) for mounting the stereo camera 112 to the excavator of FIG. 1. The housing 204 can include holes positioned in front of the lenses 202 such that the housing 204 does not block the field of view of the lenses 202.

The stereo camera 112 can be mounted above the bucket 110 in FIG. 1 and oriented facing the bucket 110. This can allow the stereo camera 112 to detect material in the bucket 110, along with other objects within the field of view of the stereo camera 112. The stereo camera 112 can transmit signals representing captured images of the field of view of the stereo camera 112 to the computing device.

Figure 3:
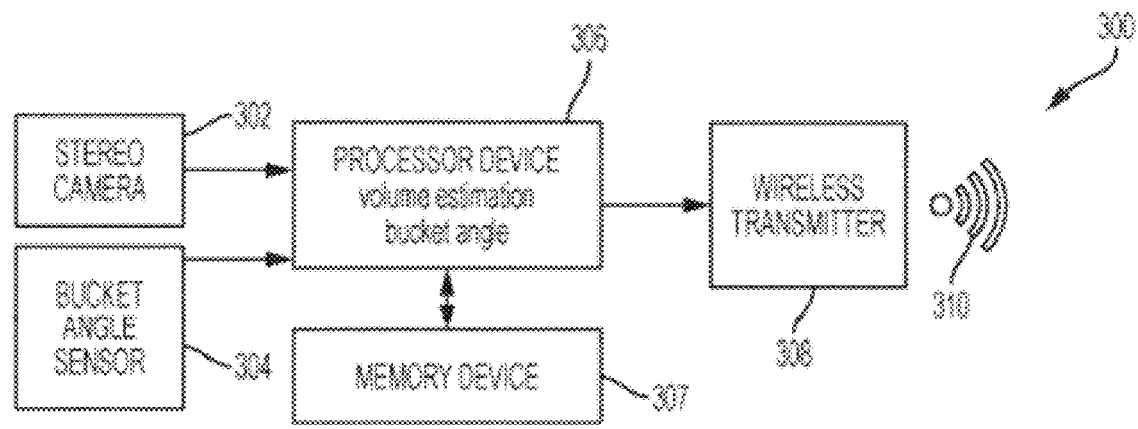
FIG. 3 is a block diagram of a volume estimation system according to one example of the present disclosure.

FIG. 3 is a block diagram of one example of a volume estimation system 300. The volume estimation system 300 includes a stereo camera 302 and a bucket angle sensor 304. In other examples, the volume estimation system 300 includes any other type of 3D sensor, such as a 3D laser scanner, an ultrasonic transducer, a range sensor, a structured light camera, a 3D camera, or a flash LIDAR, additionally or alternatively to the stereo camera 302. The bucket angle sensor 304 can be any type of sensor that can provide a reference location of a bucket of a work vehicle relative to the stereo camera 302. An example of the bucket angle sensor 304 is an inertial measurement unit (IMU) or potentiometer. The angle can alternatively be measured indirectly, such as by a hydraulic-cylinder-mounted sensor. That is, a sensor may measure the hydraulic cylinder position to determine the angle of the bucket, rather than measuring the angle of the bucket directly. In place of, or in conjunction with, bucket angle sensor 304, the angle can be measured and calculated, based on an image from stereo camera 302, by an angle determination system, such as system 2100 described below with respect to FIGS. 21-26. For the sake of the present description, it will be assumed that bucket angle sensor 304 can be any one of these sensors or any combination of these sensors.

Also included in the volume estimation system 300 is a processor device 306 and a memory device 307 that can receive data from each of the stereo camera 302 and the bucket angle sensor 304 or the angle determination system. The processor device 306 can execute one or more operations stored in the memory device 307 for determining an angle of the bucket or other container at a given point in time and for estimating the volume of material in the bucket. The processor device 306 can include one processor device or multiple processor devices. Non-limiting examples of the processor device 306 include a Field-Programmable Gate Array ("FPGA"), an application-specific integrated circuit ("ASIC"), a microprocessor, etc.

The processor device 306 can be communicatively coupled to the memory device 307 via a bus. The non-volatile memory device 307 may include any type of memory device that retains stored information when powered off. Non-limiting examples of the memory device 307 include electrically erasable and programmable read-only memory ("EEPROM"), flash memory, or any other type of non-volatile memory. In some examples, at least part of the memory device 307 can include a medium from which the processor device 306 can read the instructions. The memory device 307 can include any type of non-transitory computer-readable medium, such as electronic, optical, magnetic, or other storage devices capable of providing the processor device 306 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language, including, for example, C, C++, C #, etc. In some examples, the memory device 307 can include an image processing module (not shown). The processor device 306 can use the image processing module to perform one or more image processing tasks on data received from the stereo camera 302.

The volume estimation system 300 also includes a wireless transmitter 308 that can receive the estimated volume from the processor device and output a wireless signal 310 to another device, such as a display device or a database. The wireless transmitter 308 can represent one or more components that facilitate a network connection. Examples include, but are not limited to, wireless interfaces such as IEEE 802.11, Bluetooth, or radio interfaces for accessing cellular telephone networks (e.g., transceiver/antenna for accessing a CDMA, GSM, UMTS, or other mobile communications network). In other examples, the wireless transmitter 308 is replaced with a transmitter for transmitting the data via a wired connection to the other device.

Figure 4:
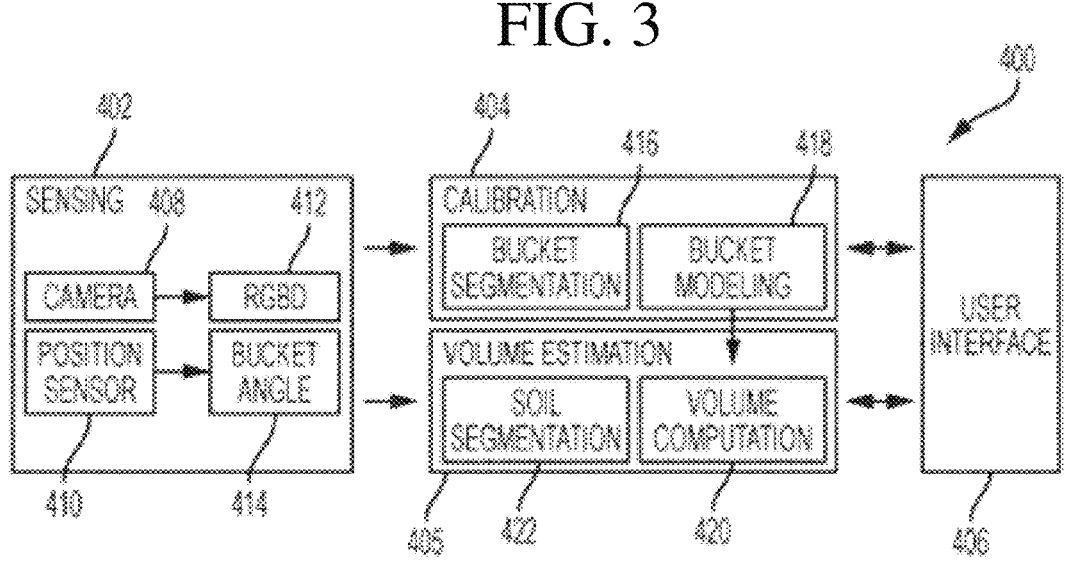
FIG. 4 is a functional block diagram of a volume estimation system according to one example of the present disclosure.

FIG. 4 is a functional block diagram of one example of a volume estimation system 400. The volume estimation system 400 includes a sensing portion 402, a calibration portion 404, and a volume estimation portion 405, along with a user interface 406 for outputting data to a user or another system. In some examples, the calibration portion 404 and the volume estimation portion 405 can be implemented by a processor device, such as processor device 306 of FIG. 3.

The sensing portion 402 includes a camera 408 or other type of sensor for capturing 3D images and data of a bucket or other container of a work vehicle. The sensing portion 402 also includes a position sensor 410 that can be a bucket angle sensor or another type of sensor. The camera 408 can provide multiple images of the bucket or other container. The images can include color content, such as red, green, blue (RGB) content, and depth content (D). The position sensor 410 (which can be angle determination system 2100, described below) can provide a bucket angle 414 or angles of the bucket or other container. The bucket angle 414 and the image data, in color and with depth information, can be provided to the calibration portion 404 and the volume estimation portion 405. In some examples, the image data of the bucket without material in it can be provided only to the calibration portion 404, and image data acquired subsequently that includes images of the bucket with material in it can be provided only to the volume estimation portion 405.

The calibration portion 404 can generate a model of the bucket using the image data and the angle data. The model can be in the form of a 3D point cloud that represents the components of the bucket, and may have information about volumes if material were at different levels in the bucket. The calibration portion 404 includes a bucket segmentation module 416 that can segment the image data to determine the components of the bucket and the positions of the components relative to each other. For example, the bucket segmentation module 416 can analyze pixel data in the images to identify the back of the bucket, the front of the bucket, the sides of the bucket, and the teeth or other protrusions extending therefrom. That information can be provided to the bucket modeling module 418 that can generate the model of the bucket as a configuration file. The configuration file can have information about the bucket in a 3D point cloud arrangement. In general, the configuration file can store various parameters (e.g., bucket capacity, dimensions, mathematical model coefficients, etc.) regarding each component of the software. The configuration file can also be outputted via the user interface 406. More information about a calibration process according to some examples is described below with reference to FIGS. 12, 13, and 14.

The model can be used by a volume computation module 420 in the volume estimation portion 405 to estimate a volume of material in the bucket. Image data and bucket angle data of the bucket with material in it can be received by a soil segmentation module 422, which can determine whether material represented in the image data is in the bucket or if it is in the background or another part of the image.

Figure 18:
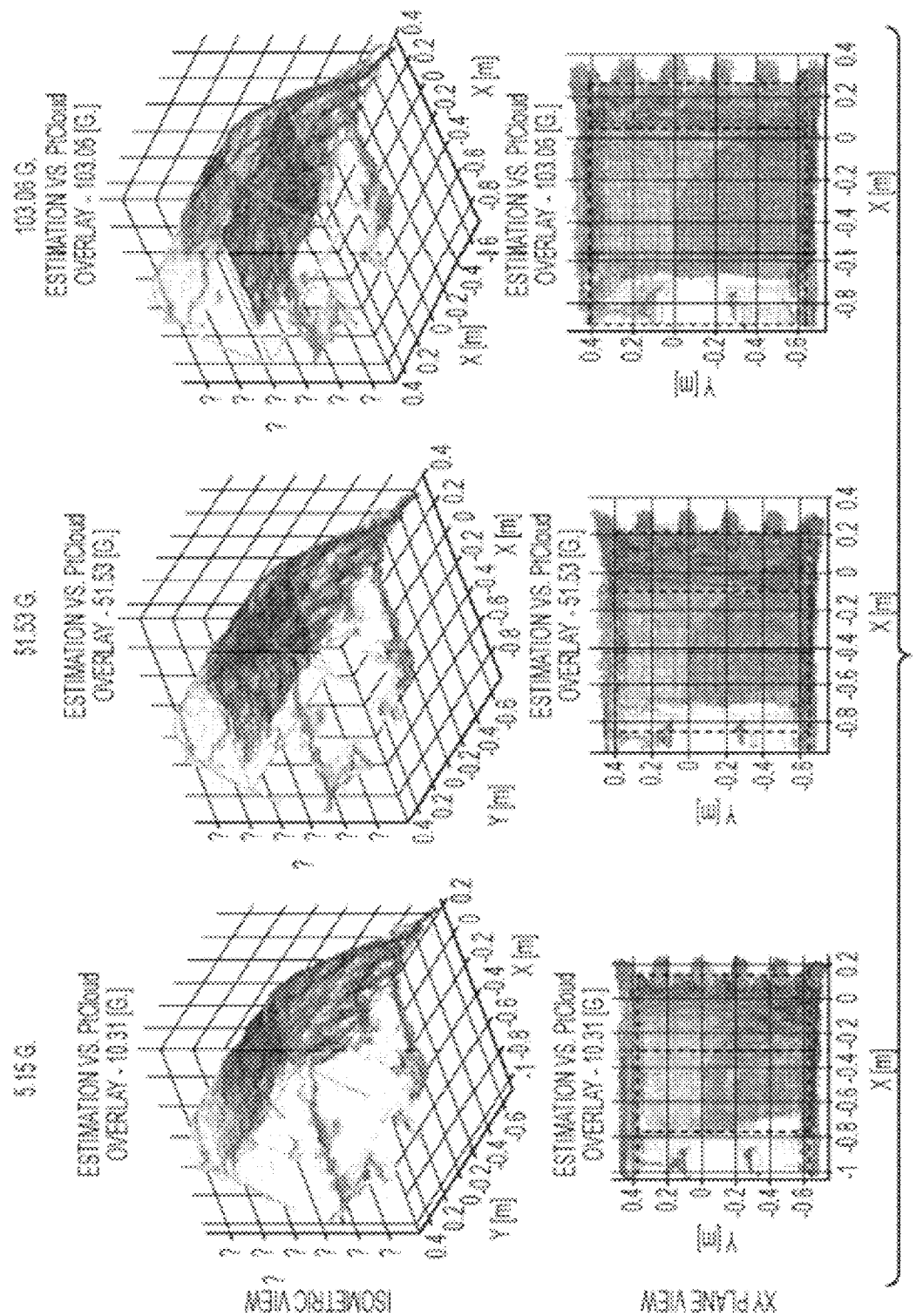
FIG. 18 includes isometric views and X/Y plane views of examples of point clouds of a container according to some examples of the present disclosure.

Examples of the model of the bucket and its contents are shown in FIG. 18. The top row in FIG. 18 includes three isometric views of a 3D model of the bucket. The isometric views can represent material accumulating in the bucket over time during a single scoop, or the different amounts of material corresponding to different scoops. In these examples, the volume computation module 420 has determined that the bucket includes 5.15 gallons of material, 51.53 gallons of material, and 103.06 gallons of material, respectively. The bottom row in FIG. 18 includes three X/Y plane views of a model of the bucket. The plane views can represent material accumulating in the bucket over time during a single scoop, or the different amounts of material corresponding to different scoops. In these examples, the volume computation module 420 has also determined that the bucket includes the 5.15 gallons of material, 51.53 gallons of material, and 103.06 gallons of material, respectively. Multiple different models and views of the bucket can be generated and presented to a user.

Figure 9:
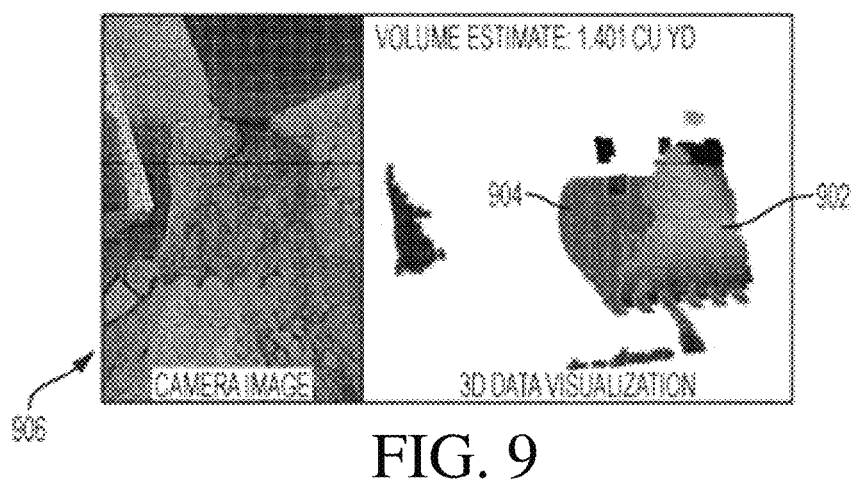
FIG. 9 depicts an example of a point cloud of material in a bucket as processed from a camera image obtained from a stereo camera according to some examples of the present disclosure.
Figure 10:
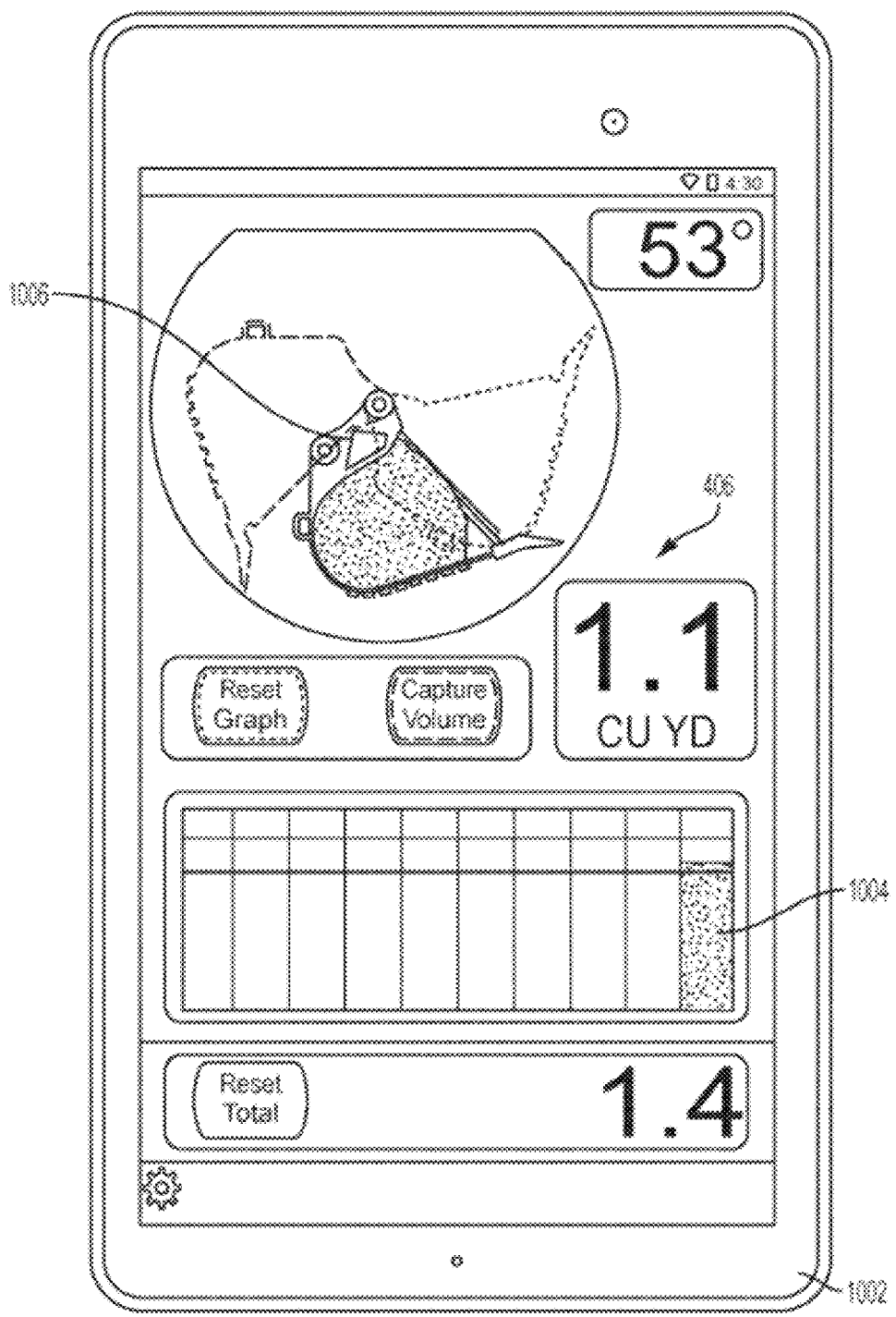
FIG. 10 depicts an example of the user interface on a display device according to some examples of the present disclosure.

Returning to FIG. 4, the image data representing material in the bucket can be provided to the volume computation module 420, which can compare that image data to the configuration file to output an estimate of the volume of the material in the bucket. The estimate of the volume can be provided to the user interface 406, which may be a display device that can output a visual representation of the volume estimation. FIG. 9 depicts an example of a point cloud of material 902 as processed from a camera image 906 obtained from a stereo camera. FIG. 10 depicts an example of the user interface 406 on a display device 1002 according to some examples of the present disclosure. The user interface 406 can include a bar chart 1004 depicting a history of volumes of material calculated from previous scoops and a three-dimensional representation 1006 of a point cloud or similar depiction of a current scoop.

Figure 5:
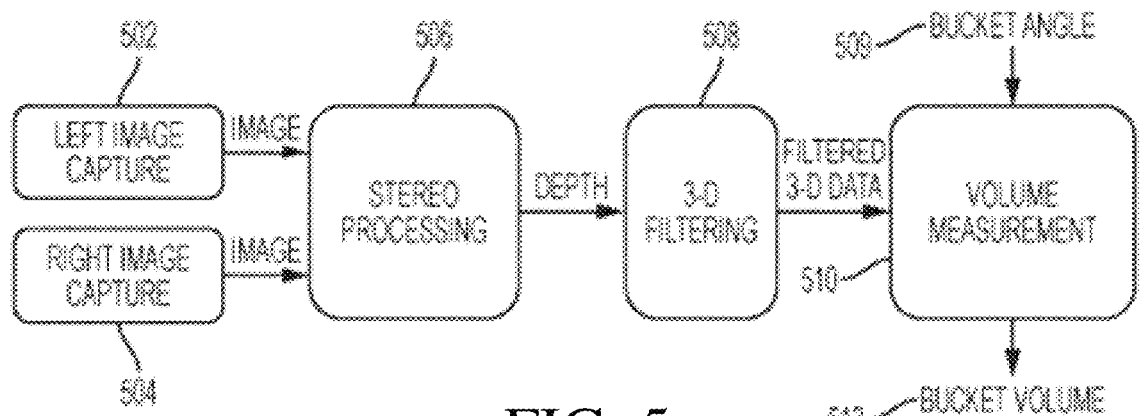
FIG. 5 is a process flow diagram for processing stereo images for measuring volume of material in a bucket according to one example of the present disclosure.

FIG. 5 is a process flow diagram for processing stereo images for measuring the volume of material in a bucket according to one example of the present disclosure. A stereo camera can capture left-eye images 502 and right-eye images 504 of a field of view that includes a bucket with material. A processor device performs stereo processing 506 on the captured images to determine depth information representing by the left-eye images 502 and the right-eye images 504. For example, the images may be time stamped and a left-eye image and a right-eye image sharing the same time stamp can be combined to determine the depth information represented by the images.

The images and the depth information are filtered using a 3D filtering process 508. For example, the filtering process 508 can remove speckles that are flying points or debris in the area, or other visual representations of objects that are not within the bucket. The filtering process 508 can include performing a speckle reduction process on the images. The filtered 3D data and a bucket angle 509 are used to determine a volume measurement 510 of the contents within the bucket. For example, the bucket angle 509 can be used to determine an expected surface area of material that is in the bucket. If the angle of the bucket with respect to a stick of an excavator is greater than ninety degrees, the expected surface area (e.g., a reference plane) from a view angle of the stereo camera may be less than if the angle of the bucket with respect to the stick is ninety degrees or around ninety degrees. The expected surface area of material can be used to analyze the actual surface area of the material in the bucket to determine a volume measurement. For example, relative transforms can be computed with respect to the expected surface area to determine if a point is earth. The volume 512 can be outputted to a display device or to a database for storage.

Figure 6:
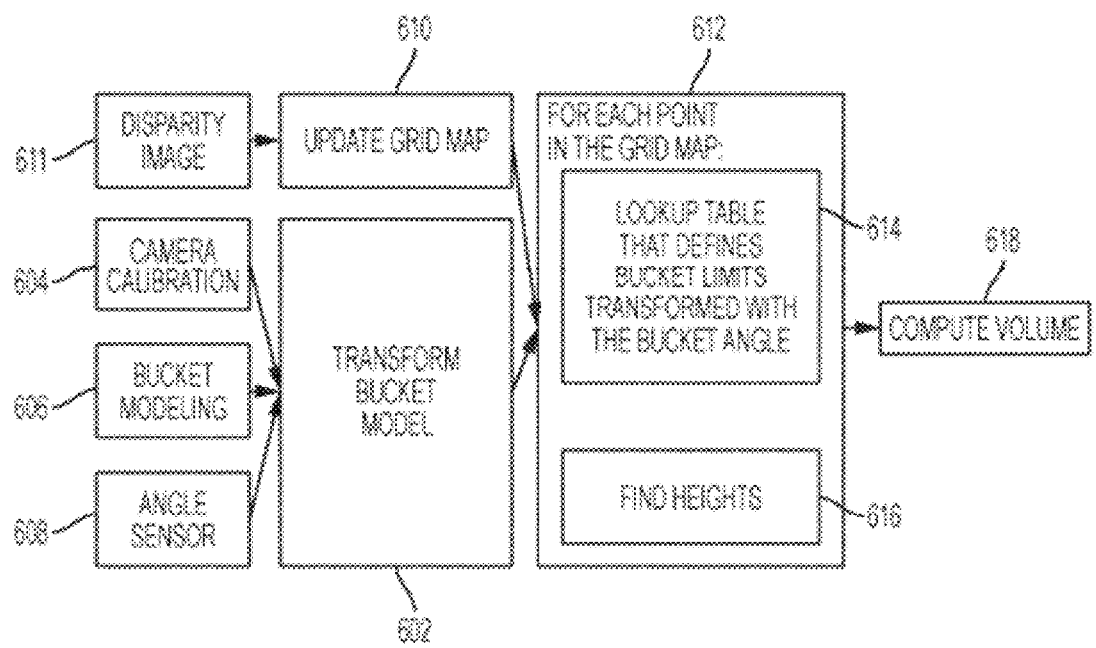
FIG. 6 is a flow diagram of a process for computing a volume of material in a container of a work vehicle according to one example of the present disclosure.

FIG. 6 is a flow diagram of a process for computing a volume of material in a container of a work vehicle according to one example of the present disclosure. Other examples can include more steps, fewer steps, or a different order of the steps shown in FIG. 6.

In block 602, a bucket model is transformed or generated using camera calibration information 604, an existing bucket model or template 606, and an angle from an angle sensor 608 or angle determination system 2100 (described below). The bucket model may be transformed or generated in a calibration stage, such as by using images of an empty bucket from the camera calibration information 604 to modify or transform an existing bucket model or template of a bucket model, in addition to the angle from the angle sensor 608 or angle determination system 2100 at which the images are acquired.

In block 610, a grid map of a 3D point cloud is updated using stereo or disparity images 611 captured by the camera of the bucket with material in it. The updated grid and the bucket model are provided to block 612 for further processing. The grid map can be updated with each new image frame that is captured by the camera.

For each point in the grid map, a look-up table is used that defines bucket limits, as transformed with the bucket angle, in block 614. The look-up table can be used, for example, in a segmenting process to identify the points from the grid map that are in the bucket, as opposed to points representing the bucket itself, background images, or speckle artifacts in the image data.

For each point in the grid map that is identified as a point that is in the bucket, the height associated with that point can be determined in block 616. In one example, the height for a point can be determined using the model of the bucket to determine depth information of a point positioned in a particular location in the bucket.

In block 618, the height information for the points can be used to compute the volume of the points within the bucket, and thus the volume of the material in the bucket. In one example, the volume for each point is determined, and then the volume for the points in the bucket are summed to compute the volume for the material in the bucket.

Figure 7:
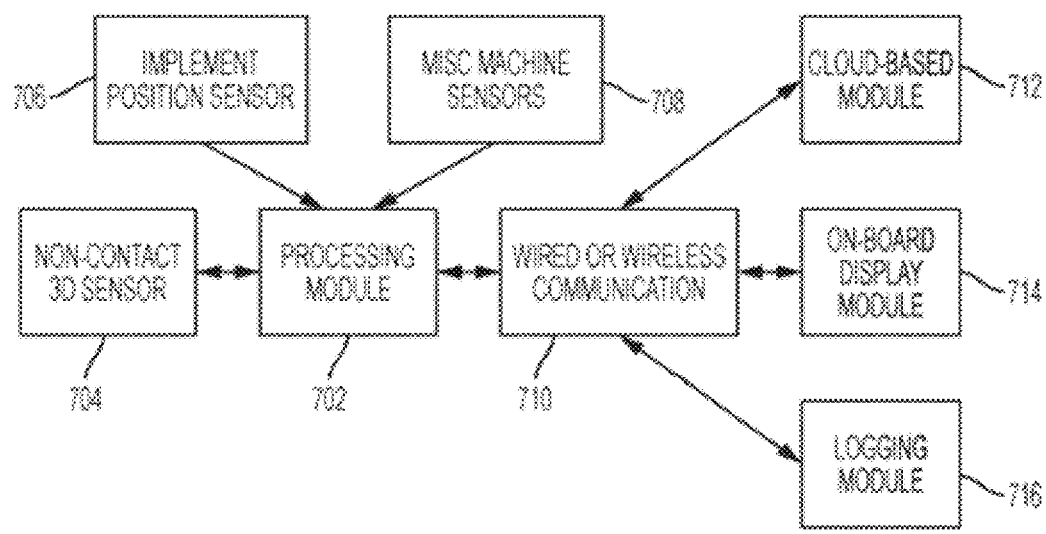
FIG. 7 is a block diagram of a hardware architecture of a volume estimation system according to one example of the present disclosure.

FIG. 7 is a block diagram of a hardware architecture of a volume estimation system according to one example of the present disclosure. The hardware architecture includes a processing module 702 to which other components are communicatively coupled through a controller area network (CAN) interface, an Ethernet interface, or another type of interface. The components can include a non-contact 3D sensor 704, which may be a stereo camera, and an implement position sensor 706, which may be an angle sensor or angle determination system 2100. An example of an implement is a bucket or other container. Other miscellaneous machine sensors 708 can also be included. These may include GPS, speed sensors, moisture sensors, or other types of sensors. The processing module 702 can communicate data and control signals with each of the sensors 704, 706, 708. The processing module 702 can also process data, such as by determining a volume estimate of material in the implement, and transceive data with other components via a wired or wireless communication module 710. The other components can include a cloud-based module 712 for allowing the data to be accessible to other users or systems via a cloud storage facility, an on-board display module 714 for displaying the data to an operator of a work vehicle, and a logging module 716 for storing the data over time for subsequent access and comparison.

Figure 8:
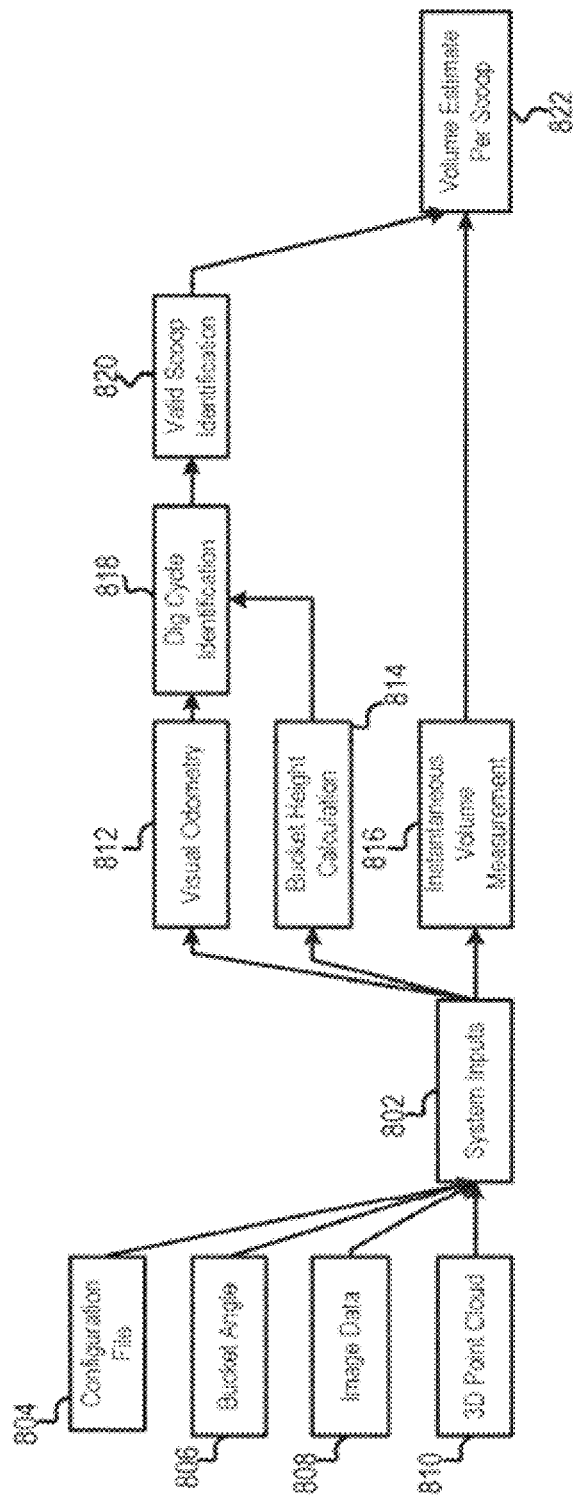
FIG. 8 is a software logic diagram for determining a volume of material in a container via a 3D sensor system according to some examples of the present disclosure.

FIG. 8 is a software logic diagram for determining a volume of material in a container via a 3D sensor system according to some examples of the present disclosure. The software logic modules can be implemented as instructions in modules stored on a non-transitory computer-readable medium and executed by a processor device.

The modules can include system inputs 802, such as a configuration file 804, bucket angle 806, image data 808, and a 3D point cloud 810. The configuration file 810 can include information about a particular container being used on the associated work vehicle. The information can include a minimum volume of the bucket, a maximum volume of the bucket, a minimum bucket angle, a maximum bucket angle, and a process for calculating scoop volume, among other possible data. The bucket angle 806 may be the angle of the bucket relative to a camera. The image data 808 can include images of the bucket from the camera. The 3D point cloud 810 includes a model or representation of one or more of the images of the image data 808.

The system inputs 802 are provided to addition modules. The additional modules include visual odometry 812, bucket height calculation 814, and instantaneous volume measurement 816. The visual odometry module 812 can use image data, 3D data, vehicle sensor data, or any combination of these to produce a magnitude and a direction of lateral and longitudinal motion. The output can be provided to a dig cycle identification module 818 and can be used to determine whether the operator is digging the soil or moving the bucket for another purpose. The bucket height calculation 814 can include processes for outputting a bucket height to the dig cycle identification module 818. The relevant bucket can identified, which may include analyzing image data to identify pixels or points within the image that corresponds to the bucket. The bucket height can measure the separation of the bucket from the ground. The bucket height can be positive if the bucket is above the ground and it can be negative if the bucket is inside the ground or the material being moved. The ground level can be identified by analyzing the image data to identify the pixels or points representative of the ground. The bucket height at the particular point in time is provided to the dig cycle identification module 818.

The dig cycle identification module 818 can receive data and signals generated by other modules to identify the dig cycle associated with the data. The identification is provided to a valid scoop identification module 820 that can determine whether the scoop is valid.

The instantaneous volume measurement 816 can calculate a time-stamped volume measurement based on the system inputs 802. The instantaneous volume measurement, along with the scoop identification, can be provided to represent an volume estimate of contents per scoop 822 of the bucket or other container.

Figure 11:
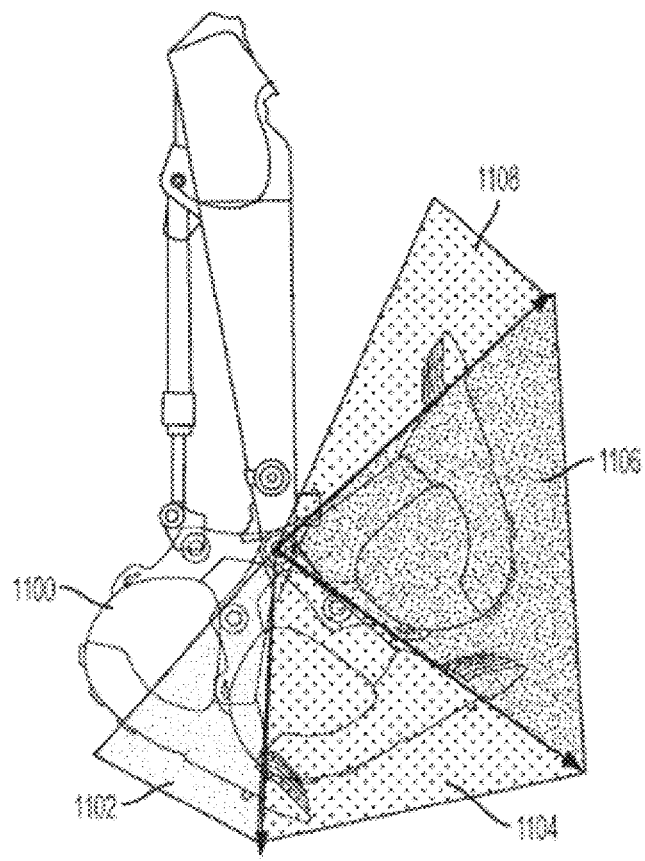
FIG. 11 is a side view of an example of a container that is rotatable through different zones according to some examples of the present disclosure.

In some examples, as a container rotates to dig earth, the container can pass through ranges of angles, or zones. A processor device may perform different operations for determining a volume of material in the container as the container passes through each of the zones. For example, in FIG. 11, the container 1100 is rotatable through zones 1102-1108. Each zone 1102-1108 includes a range of angles at which the container 1100 can be rotated while digging earth. As the container 1100 rotates to dig earth, the container 1100 can pass through some or all of the zones 1102-1108 shown in FIG. 11. A processor device can use an angle sensor or angle determination system 2100 to detect or determine an angle of rotation of the bucket 110 and perform zero or more tasks when the processor device determines that the container 1100 is in each of the zones 1102-1108.

For example, zone 1102 can be an empty zone in which the container 1100 may not include any contents. The processor device can use the angle sensor or angle determination system 2100 to detect that the container 1100 is in zone 1102 and perform tasks, such as (i) updating a database to indicate a previous scoop volume, which can be a volume of material in a previous scoop of the container; (ii) updating a running total of the volume of material obtained after multiple scoops of the container; (iii) incrementing a scoop counter, which can be a counter of a number of scoops performed by the container; (iv) beginning to calculate a new scoop volume, which can be a volume of material in a current scoop of the container; or (v) any combination of these. Zone 1104 can be a "no action zone" in which the processor device may not take measurements of the interior of the container 1100 using a 3D sensor. The no action zone can include a range of angles for which there would be an insufficient amount of the interior of the container 1100 positioned within the capture field of the 3D sensor to obtain useful measurements. Zone 1106 can be a "capture zone" in which the processor device can use the 3D sensor to take measurements of the container 1100 that can be used for determining a volume of the contents in the container 1100. Zone 1106 can represent a range of angles at which the interior of the container 1100 is within a suitable capture field of the 3D sensor to enable the 3D sensor to detect the contents within the bucket 110. Zone 1108 can be another "no action zone" in which the processor device may not take measurements of the interior of the container 1100 using a 3D sensor. The processor device can identify any number and combination of zones through which the container 1100 can rotate while digging earth and perform any number and combination of tasks for each zone.

In some examples, the processor device can perform a calibration process prior to determining a volume of the contents in a container 1100. For example, the processor device can perform the calibration process when a new container 1100 is being used for the first time. The calibration process can result in calibration data corresponding to the container 1100 when the container 1100 is empty. The calibration data can serve as a baseline against which subsequent measurements of the container 1100 (e.g., when the container 1100 includes earth) can be compared. In some examples, the processor device can store the calibration data in a database for later use. The calibration process can be repeated for a variety of different containers to generate a default library of calibration data for the containers.

Figure 12:
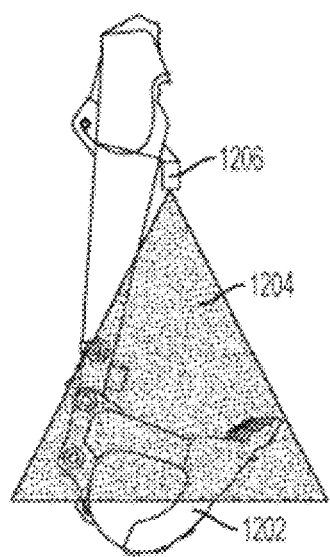
FIG. 12 is a side view of an example of a container within a field of capture of a 3D sensor according to some examples of the present disclosure.

An example of the calibration process is described below with reference to FIGS. 12-17. FIG. 12 is a side view of an example of a container 1202 within a capture field 1204 of a 3D sensor 1206. A processor device can perform a calibration process to determine calibration data for the container 1202 using measurements taken by the 3D sensor 1206 and user input.

For example, the processor device can perform the calibration process using a rated capacity of the container 1202, a shape of the container 1202, and a strike plane of the container 1202. The rated capacity of the container 1202 can be provided as user input, and may be imprinted on a side of the container 1202, provided in a manual with the container 1202, or otherwise provided to the user by a manufacturer of the container 1202. An example of a rated capacity for the container 1202 can be 1.3 cubic meters. The shape of the container 1202 can be determined based on measurements from the 3D sensor 1206. For example, the container 1202 can be slowly curled up and down several times while the 3D sensor 1206 takes sensor measurements. A processor device can then use the sensor measurements to generate a three-dimensional (3D) representation of the shape of the bucket (e.g., using any of the techniques described above). The strike plane can also be determined based on measurements from the 3D sensor 1206. A strike plane can be a two-dimensional plane that corresponds to the top of the container 1202 and includes the four corners of the container 1202. Examples of a strike plane are shown as dashed lines in FIGS. 13-14 and shaded regions 1502 in FIGS. 15-17. In some examples, the processor device uses the sensor measurements from the 3D sensor to approximate the strike plane of the container 1202, and then a user may be able to fine tune the strike plane via user input. As described later with respect to angle determination system 2100, the 2D area of the visible strike plane, for example from FIGS. 15-17, may be used to estimate an angle of the bucket.

Figure 13:
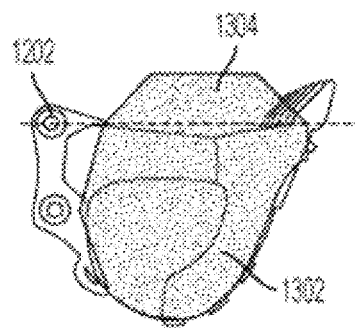
FIG. 13 is a side view of an example of a container according to some examples of the present disclosure.
Figure 14:
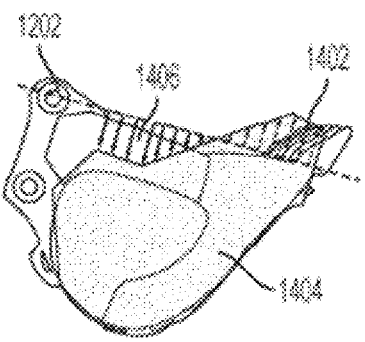
FIG. 14 is a side view of an example of a container with a scoop of material according to some examples of the present disclosure.
Figure 15:
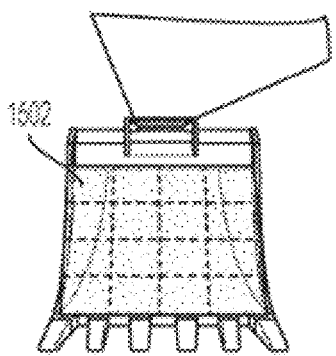
FIG. 15 is a top view of an example of a container positioned at a first angle according to some examples of the present disclosure.
Figure 16:
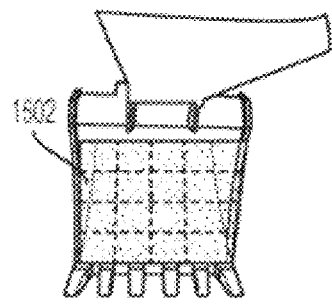
FIG. 16 is a top view of an example of a container positioned at a second angle according to some examples of the present disclosure.
Figure 17:
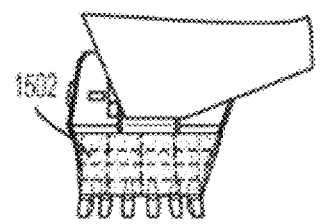
FIG. 17 is a top view of an example of a container positioned at a third angle according to some examples of the present disclosure.

Referring now to FIG. 13, at least part of the calibration process can include determining a volume of the interior 1302 of the container 1202. The volume of the interior 1302 of the container 1202 can be determined by filling the container 1202 with earth (e.g., by scooping earth) such that a top layer 1304 of material that protrudes beyond the strike plane (e.g., represented by the dashed line). The container 1202 may be full or over capacity. A volume of the top layer 1304 of material can be determined by comparing an empty bucket grid map that has grid cells, each with a known surface area, to the images of the material in the bucket. The height of the strike plane for each grid cell can be known and have a known volume. The difference between the height can be measured and added to the known volume. The volume of the interior 1302 of the container 1202 can then be determined by subtracting the volume of the top layer 1304 from the rated capacity of the container 1202 provided by the user.

In some examples, the calibration process also includes determining a volume of a scoop of material in the container 1202. An example of a scoop of material is represented by the shaded region in FIG. 14. As shown, the scoop of material has an uneven shape, with one portion 1402 of the material being above the strike plane, another portion 1404 of the material being below the strike plane, and an empty space 1406 being between an upper surface of the other portion 1404 of the material and the strike plane. A volume of the portion 1402 of material above the strike plane can be determined by detecting the top surface of the material, determining an angle of the strike plane, and calculating a volume of the portion 1402 of the material that is above the strike plane using the detected top surface of the material and angle of the strike plane. The top surface of the material can be detected using the 3D sensor. A volume of the empty space 1406 below the strike plane can also be determined using the detected top surface of the material and the angle of the strike plane. The volume of the scoop can be determined via the following equation:

$$V\_scoop = V\_interior + V\_above - V\_empty$$

where V_scoop is the volume of the scoop, V_interior is the volume of the interior 1302 of the container 1202, V_above is the volume of the portion 1402 of the material above the strike plane, and V_empty is the volume of the empty space 1406 below the strike plane.

Figure 19:
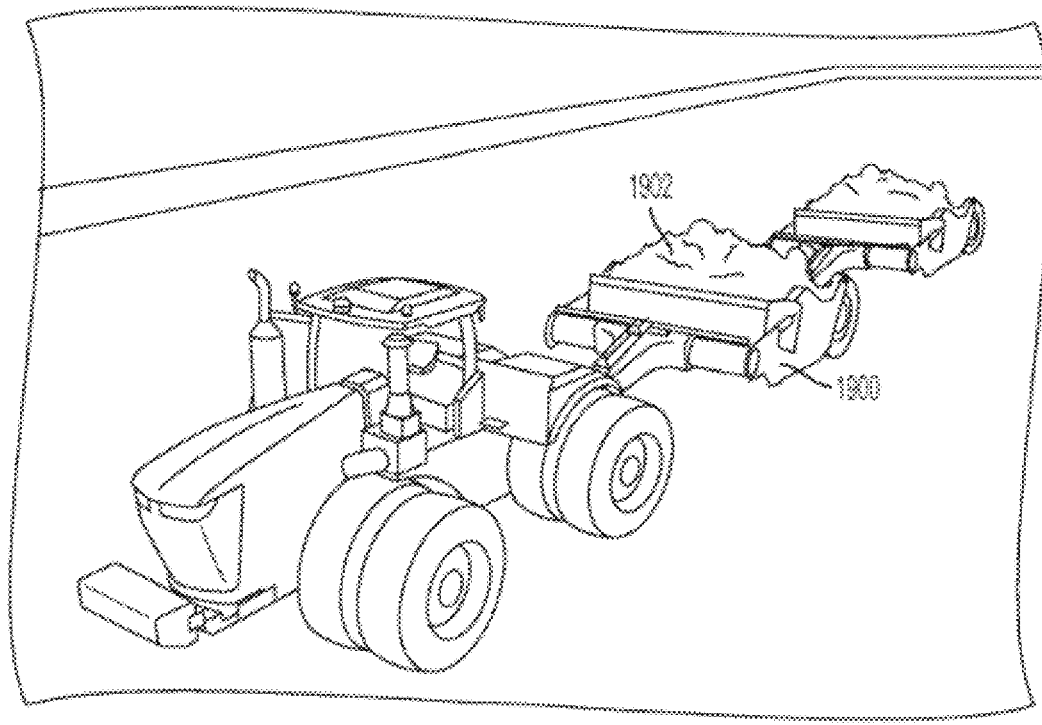
FIG. 19 is a perspective view of an example of a scraper according to some examples of the present disclosure.

Examples of the present disclosure can be implemented using any type of work vehicle, such as an excavator or scraper. One example of a scraper 1900 is shown in FIG. 19. The scraper 1900 can be a piece of equipment used for earthmoving. The scraper 1900 can include a container 1902 and a cutting edge that can be raised or lowered. As the scraper 1900 moves along a surface, the cutting edge can scrape up earth and fill the container 1902.

Figure 20:
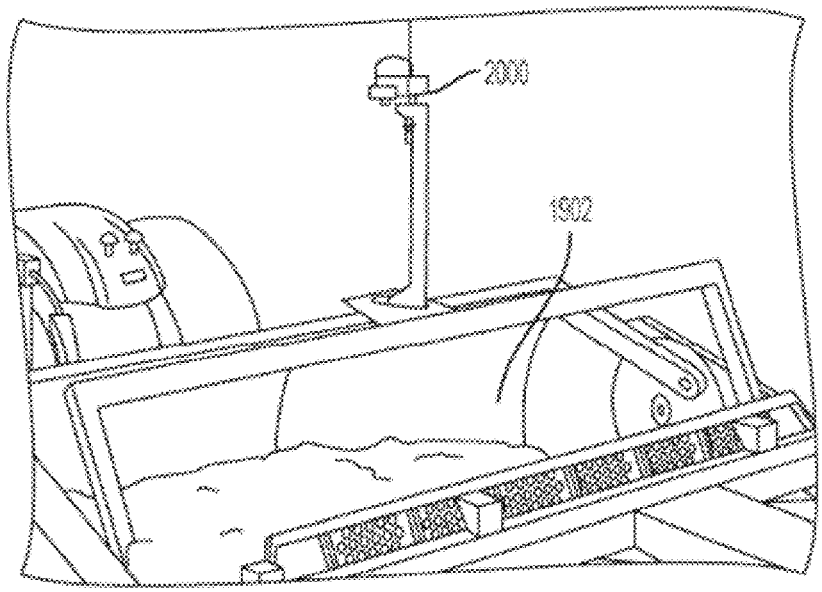
FIG. 20 is a perspective view of an example of a container of a scraper according to some examples of the present disclosure.

One example of at least a portion of a volume estimation system 2000 coupled to the scraper 1900 is shown in FIG. 20. The volume estimation system 2000 can include a 3D sensor configured to capture material in the container 1902. The volume estimation system 2000 can use measurements from the 3D sensor to perform a calibration process for the container 1902, determine an amount of material that has accumulated in the container 1902, or both of these.

Figure 21:
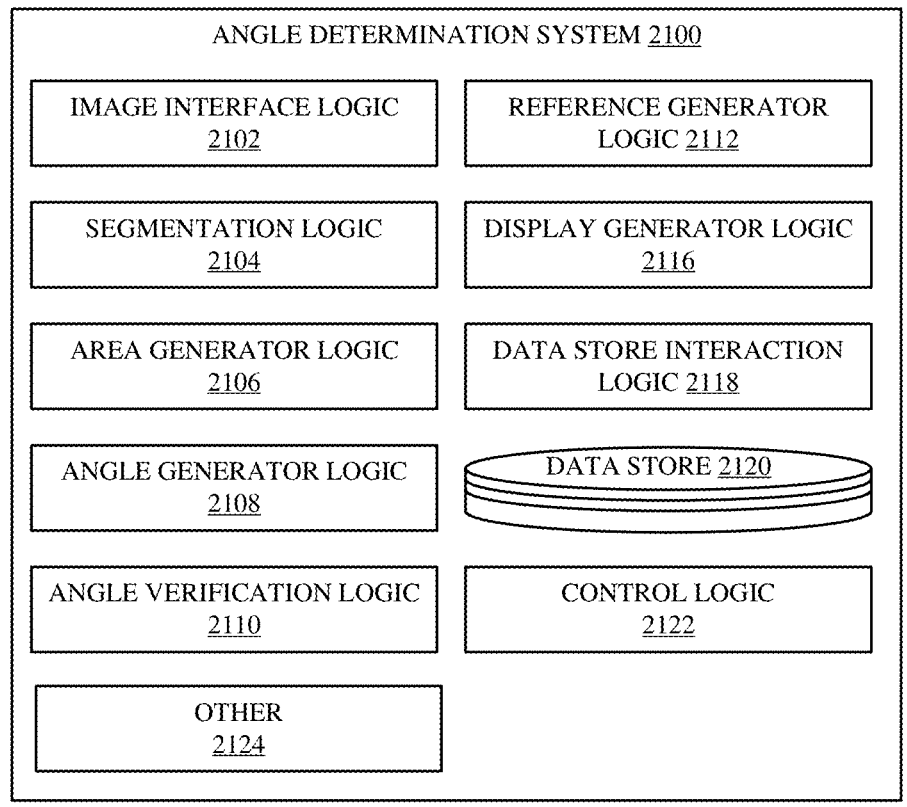
FIG. 21 is a block diagram showing one example of an angle determination system.

FIG. 21 is a block diagram showing one example of an angle determination system 2100. Angle determination system 2100 can be used in place of, or in conjunction with, any of the previously mentioned angle sensors. Angle determination system 2100 can be deployed on, for example, machine 100 and/or for example, utilize processor 306. Angle determination system 2100 includes a variety of different components that can perform a variety of different functions. Some of these functions will be described in greater detail with respect to FIG. 22.

Briefly, image interface logic 2102 receives images or other sensor signals from a sensor. For example, the images can be received from one of the 3D sensors described in detail above. Image interface logic 2102 can also perform other image pre-processes as well, such as, stereo image processing, light correction, scaling, focusing, anti-aliasing, formatting, etc. Segmentation logic 2104 analyzes the image and identifies a container, for example an excavator bucket, in the image. Segmentation logic 2104 can identify the container in a variety of different ways such as, based on detecting reference points, edge detection, comparison to a reference image, etc. Once identified, segmentation logic 2104 can extract or segment out a portion or segment of the image containing the container. For example, segmentation logic 2104 can be similar to or the same component as bucket segmentation 416, described above. Area generator logic 2106 calculates a geometric area of the image segment identified by segmentation logic 2104 as including the container. Angle generator logic 2108 calculates an angle of the container based on the image of the container. For instance, angle generator logic 2108 can use the area calculated by area generator logic 2106 to determine the angle of the container. The angle calculated by angle generator logic 2108 can be used in the above volume estimation system or it can be used by a control system 2122 or other machine control system, as control feedback, to perform control.

Figure 26:
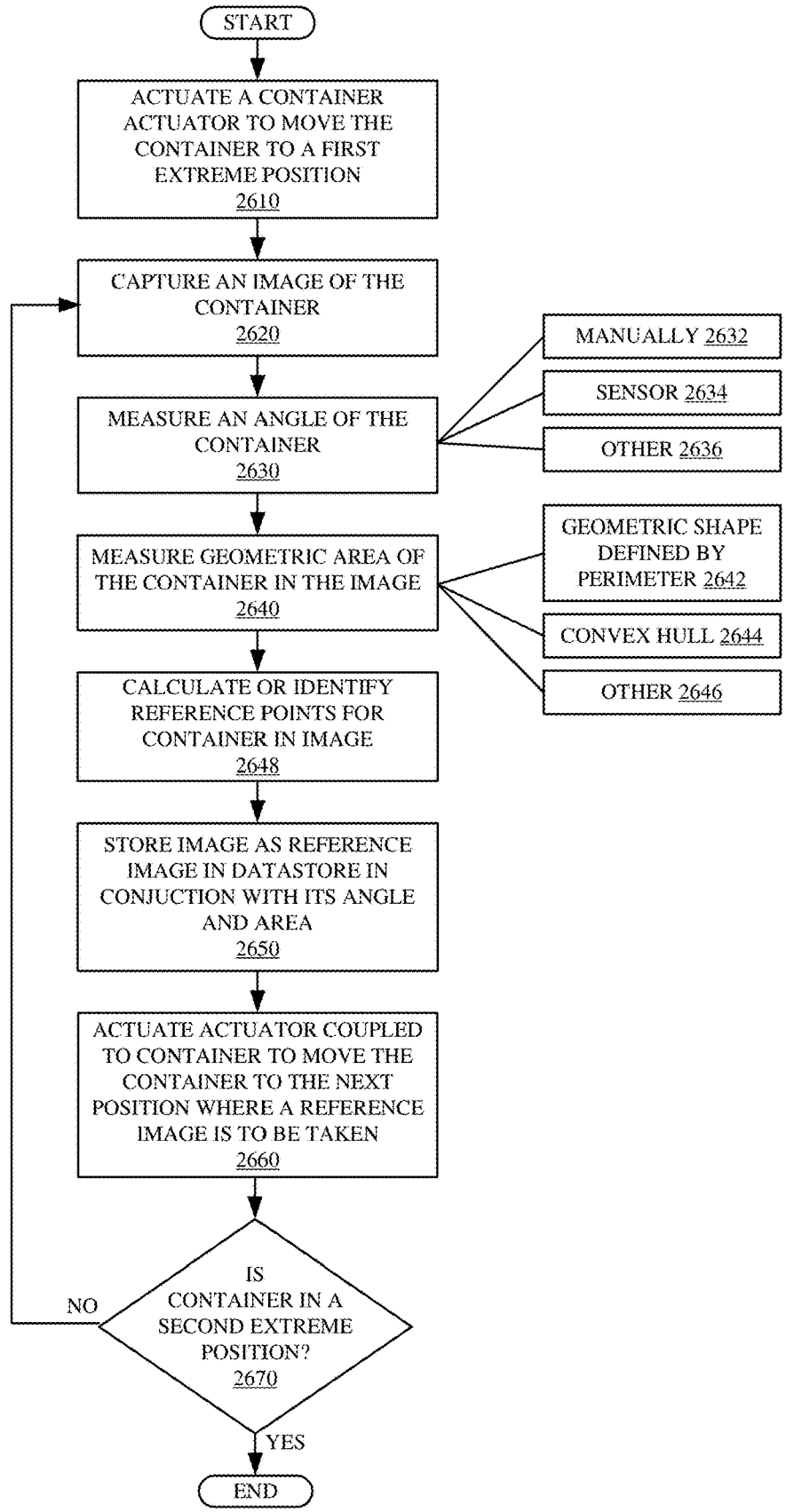
FIG. 26 is a flow diagram showing one example of operation of reference generator. logic.

Reference generator logic 2112 generates a set of reference images and utilizes data store interaction logic 2118 to store the images in data store 2120. A reference image refers to a previously captured image of the container where various properties of the container, at the time of the image, are known. FIG. 26, described in greater detail below, shows one example operation of reference generator logic 2112.

For example, there may be a reference image for each degree (or other unit) of rotation of the container. Angle verification logic 2110 can use such a reference image to verify an angle calculated by angle generator logic 2108. For example, angle generator logic 2108 captures an image and identifies characteristics of a container at a specific angle and angle verification logic 2110 retrieves a reference image corresponding to (or closest to) the calculated angle and confirms that the images (the captured image of the container and the reference image of the container) have similar characteristics.

As another example, the reference images may have the location of reference points on the container known and can have those specific points on the container identified. For instance, the perimeter and identifying points (such as the corners of the container) may be known in the reference image and identified in the captured image. Segmentation logic 2104 may use these known points of interest in the reference image to identify the bounds of the container in a captured image.

Display generator logic 2116 displays the angle of the container, volume of contents in the container, and/or other calculated metrics to a user. Data store interaction logic 2118 is utilized by other components to retrieve and store data into data store 2120. Control system 2122 generates control signals that actuate various actuators of the work machine. Control system 2122 can receive feedback information indicative of angles or positions of the controlled components, such as a bucket, arm, or boom of an excavator, for more precise control of the components.

Figure 22A:
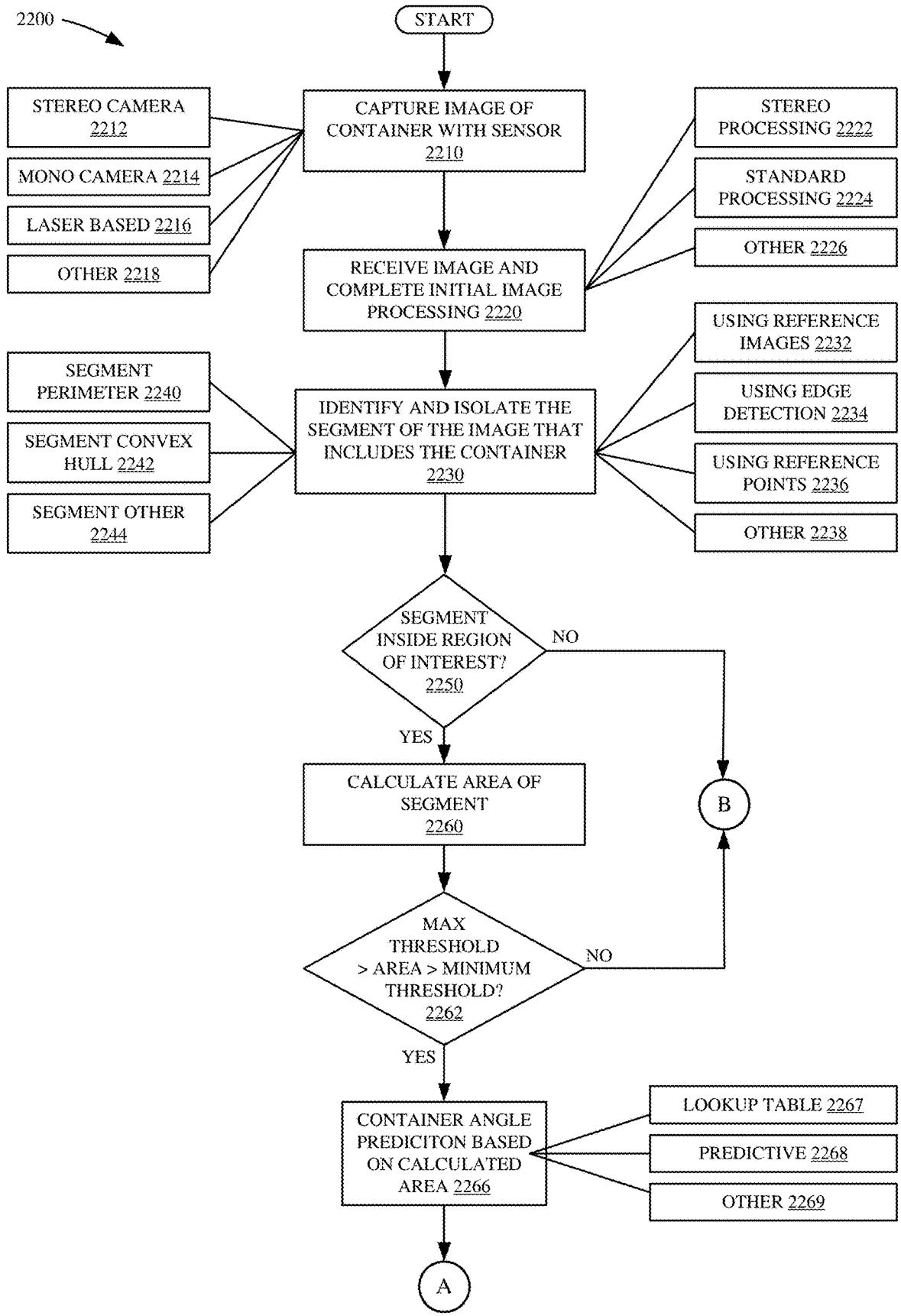
FIGS. 22A-22B (Collectively referred to herein as FIG. 22) are a flow diagram showing one example of a method of controlling a work machine
Figure 22B:
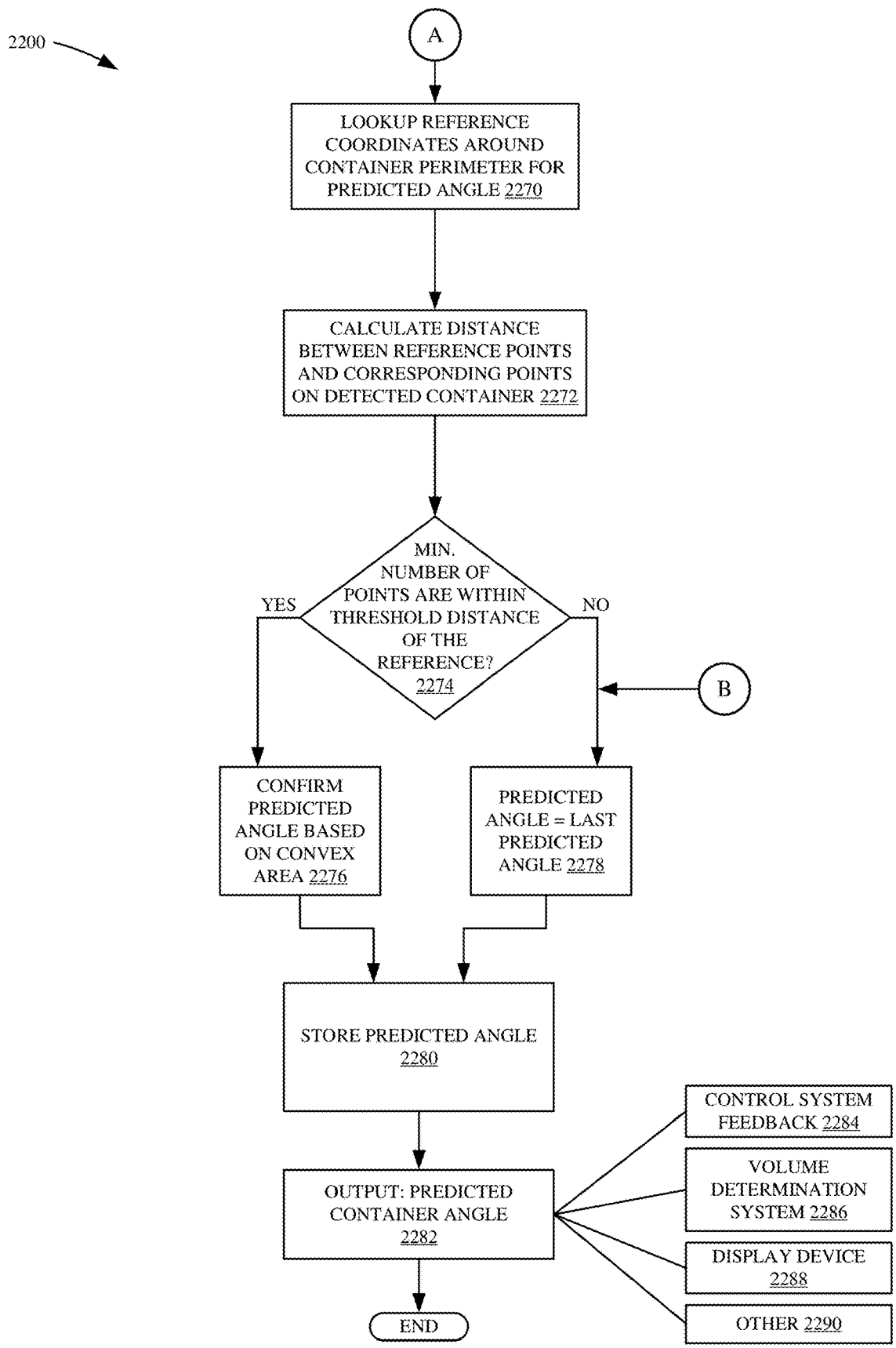

FIGS. 22A and 22B (collectively referred to as FIG. 22) are a flowchart showing one example of the operation of the angle determination system 2100 deployed on a mobile machine. The operation 2200 begins at block 2210 where an image of the container is captured with a sensor. The sensor can be a stereo camera as described above and as indicated by block 2212. The sensor can be a standard camera, as indicated by block 2214. The sensor can be a laser-based sensor, as described above, and as indicated by block 2216. Of course, the sensor can be a different type of sensor as well, as indicated by block 2218.

The operation 2200 proceeds at block 2220, where the image is received by image interface logic 2102. Image interface logic 2102 may, in an instance where the sensor is a stereo camera, complete stereo image processing, as indicated by block 2222. Stereo image processing has been described in further detail with respect to FIG. 5. Image interface logic 2102 can complete standard image processing on the received image(s) as well. Standard image processing includes, but is not limited to, light correction, scaling, focusing, anti-aliasing, formatting, etc. Image interface logic 2102 may process the image(s) in other ways as well, as indicated by block 2226.

The operation 2200 proceeds at block 2230, where segmentation logic 2104 identifies and segments the portion of the image containing the container. In one example, segmentation logic 2104 completes the functions described above with respect to bucket segmentation 416 from FIG. 4. Segmentation logic 2104 can identify the container using reference images, as indicated by block 2232. For example, segmentation logic 2104 retrieves a plurality of reference images that contain the container and each reference image has metadata indicative of the location of the container in the reference image. These reference images (or the segment of the reference image) are compared against the captured image for similarities to identify the container in the captured image.

Segmentation logic 2104 can identify the container using edge detection, as indicated by block 2234. For example, segmentation logic 2104 can use known edge detection or image discontinuity methods to identify edges that correspond to a known or approximated shape of the container. Segmentation logic 2104 can identify the container using reference points, as indicated by block 2236. For example, segmentation logic 2104 can identify known unique points of the container. For instance, where the container is a bucket, the bucket teeth and bucket linkage point often have visually unique characteristics that can be associated with reference points and identified based on their uniqueness. Segmentation logic 2104 can identify the container in the image using a combination of the above methods or in other ways as well, as indicated by block 2238.

After segmentation logic 2104 identifies the container in the image, segmentation logic 2104 isolates the segment that includes the container. Segmentation logic 2104 can isolate the segment based on the perimeter of the identified container, as indicated by block 2240. For example, the segment is isolated along an edge detected as the perimeter of the container and anything outside of the detected perimeter is discarded. Segmentation logic 2104 can isolate the segment about a calculated convex hull, as indicated by block 2242. For example, segmentation logic 2104 identifies points of the container and calculates a convex hull around these points, the convex hull is then segmented or isolated. In other examples, segmentation logic 2104 isolates the segment based on a different method, as indicated by block 2244. One example of segmentation logic 2104 identifying a container is described in greater detail with reference to FIG. 23.

Figure 23:
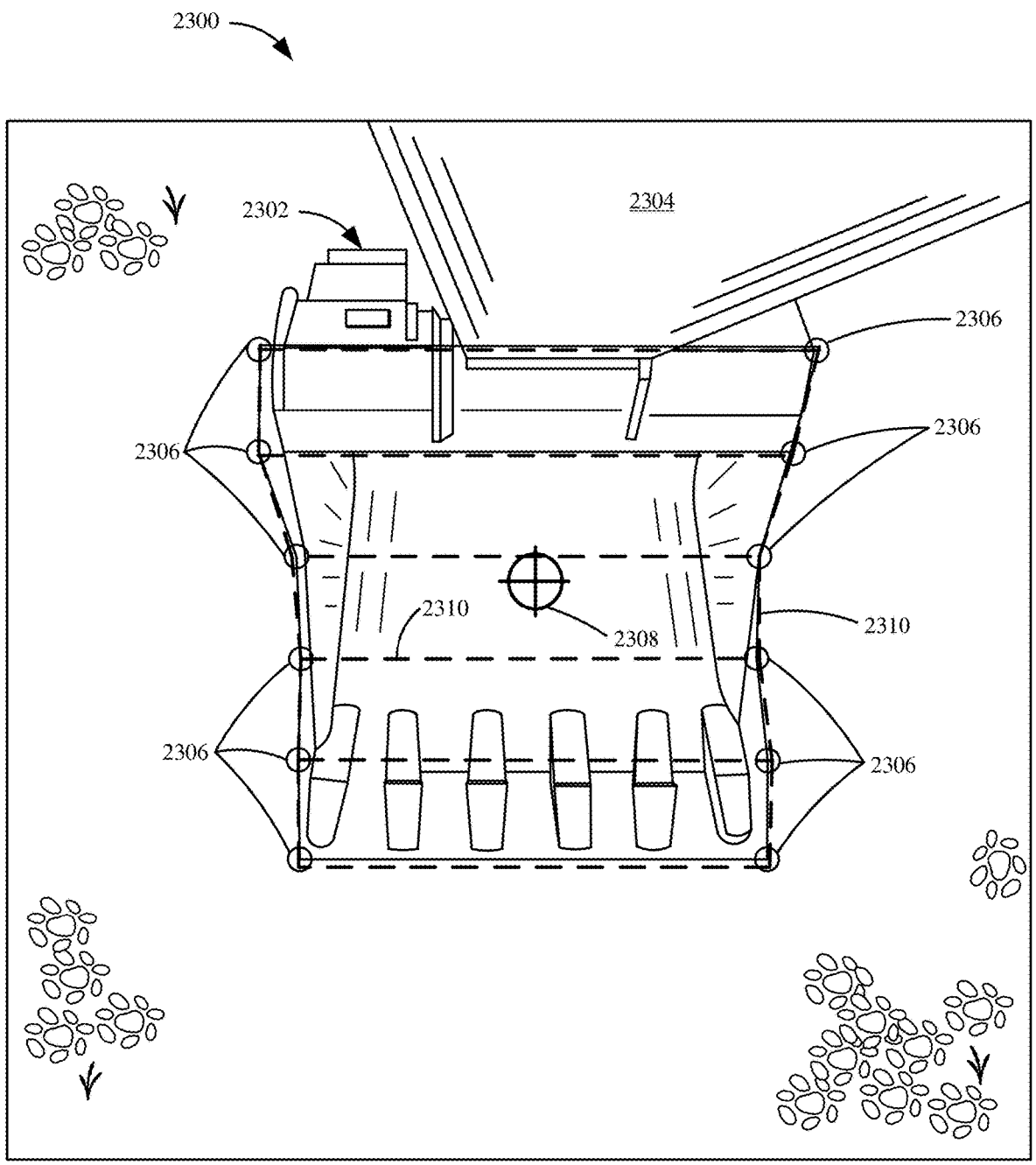
FIG. 23 illustrates one example of a point of view from a 3D sensor.

FIG. 23 shows one example of an image captured from an arm mounted image sensor, such as sensor 112 in FIG. 1. View 2300 shows an arm 2304 and bucket 2302. Superimposed over the bucket 2302 are reference points 2306, center point 2308 and reference lines 2310. These objects are examples of features that segmentation logic 2104 can use to identify bucket 2302 from the surrounding image 2320.

Turning back to FIG. 22, the operation 2200 of identifying the angle of the bucket proceeds at block 2250 where it is determined whether the segment is within a region of interest, that is, a region of the image where the container is expected to be. If the segment is not within a region of interest method 2200 proceeds at block 2278 where the current bucket angle is set to the "last predicted angle" and operation 2200 begins again at 2210. If the segment is within a region of interest, method 2200 proceeds at block 2260.

At block 2260, area generator logic 2106 calculates a two-dimensional area of the segment. Then at block 2262, the calculated area is compared to a minimum and maximum threshold. For example, the minimum and maximum thresholds can represent previously calculated minimum and maximum areas of the bucket. The threshold values can be identified from a calibration cycle, such as that described below with respect to FIG. 26, where the container (bucket) is controlled to move through a full range of motion. The maximum and minimum areas obtained during that movement define the corresponding threshold values. If the area is less than the minimum threshold or greater than the maximum threshold, the predicted angle is set to the last predicted angle, as indicated by block 2278.

If the area is greater than the minimum threshold and less than the maximum threshold, then operation 2200 continues at block 2266. At block 2266, the angle of the container is predicted by angle generator logic 2108, based on the calculated area. Angle generator logic 2108 can predict the angle based on a lookup table, as indicated by block 2267. For example, angle generator logic 2108 can access a table of data where each data point has an area value and corresponding angle value. Then angle generator logic 2108 can access the data point on the table having the closest area value and use its corresponding angle value as the predicted angle. Angle generator logic 2108 can predict the angle based on predictive techniques such as, but not limited to, interpolation, extrapolation, trend line, etc., as indicated by block 2268. Angle generation logic 2108 can identify the angle in other ways as well, as indicated by block 2269. Some examples of block 2266 are now described with respect to FIG. 24.

Figure 24:
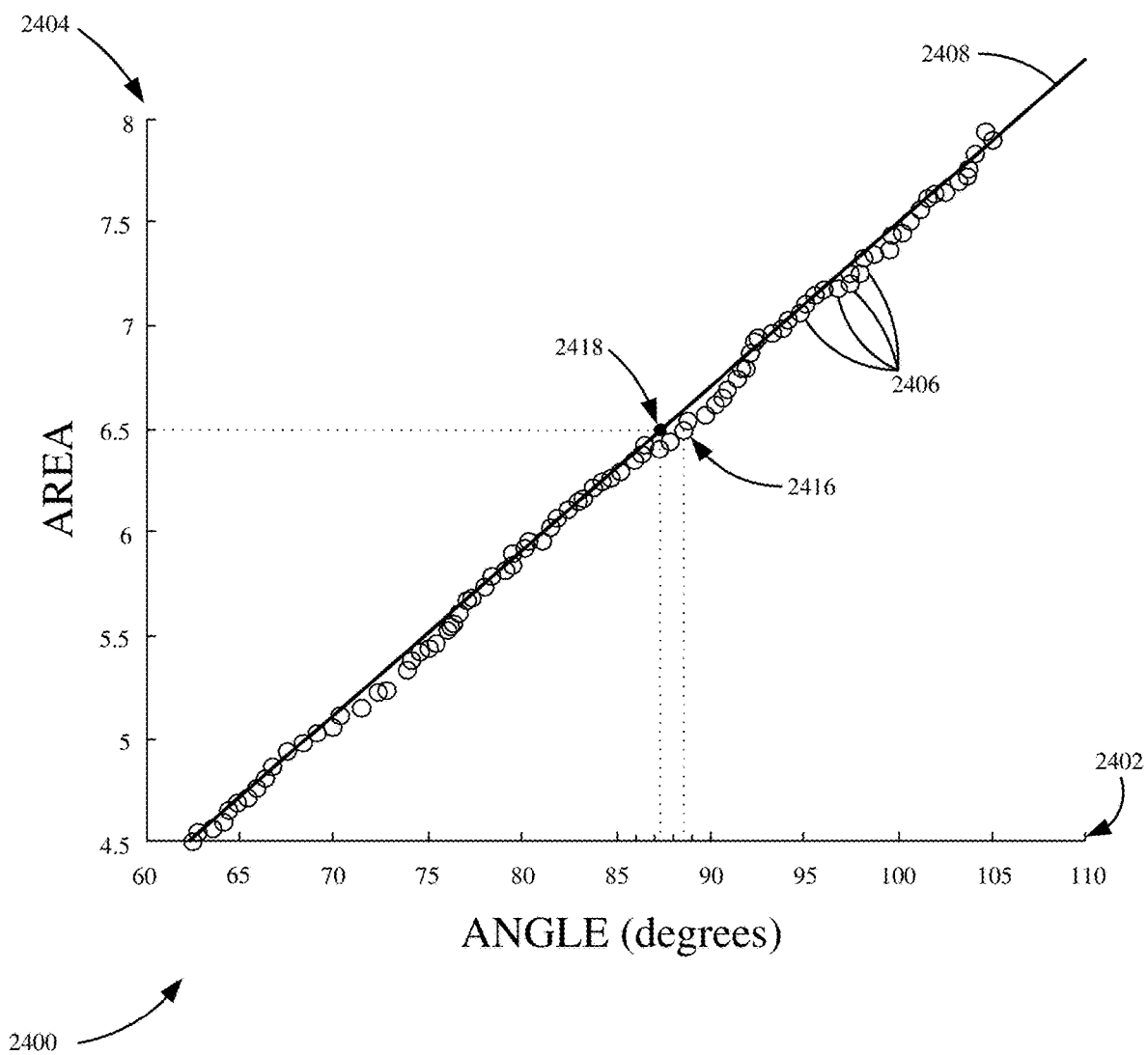
FIG. 24 is a chart of plotted data having an area and angle axis.

FIG. 24 is a chart showing one example of area data correlated to angle data. Chart 2400 can be populated with data points 2406 gathered in a calibrating process, for example, the process described below with respect to FIG. 26. Chart 2400 comprises X-axis 2402 and a Y-axis 2404. Y-axis 2404 is indicative of the area of the container in a captured image. X-axis 2402 is indicative of an angle of the container when the image was captured. Trendline 2408 is indicative of the trend or identified relationship between container geometric area in an image and the angle of the container.

In one example of identifying the container angle in block 2266, the area calculated in block 2260, is equal to 6.5 units. Using a lookup operation set out in block 2267, logic 2108 accesses a lookup table (represented by chart 2400) comprising values that correspond to the various data points 2406. The closest data point with an area value of 6.5 is reference point 2416. Reference point 2416 has an angle (X)

value of 88.7 degrees and therefore, under this example of block 2267, the angle will be identified as 88.7 degrees.

In another example (set out in block 2268 of FIG. 22), trendline 2408 may be used to identify the angle. For instance, if the area in this example was also calculated to be 6.5 units and no data point 2406 corresponded precisely to the value of 6.5 units, then point 2418 on trendline 2408 (that corresponds to an area value of 6.5) is used to identify the angle value. In this instance point 2418 has an angle (X) value of 87.2 degrees. Therefore, in this example of block 2268, the angle is identified as 87.2 degrees.

Returning again to FIG. 22, operation 2200 can output the identified angle at this point. In another example, an additional check is performed to confirm that the angle is accurate. In such an example, processing continues at block 2270 where angle verification logic 2110 uses data store interaction logic 2118 to access reference data in data store 2120. Specifically, angle verification logic 2110 can access reference coordinates around a reference container perimeter for the predicted angle from block 2264. For example, the predicted angle from block 2264 is used as input to a lookup table of reference images (with corresponding data, such as the angle, area, perimeter, reference coordinates corresponding to the location of the container, etc.) and the reference image with the closest angle to the predicted angle from 2264 is selected.

At block 2272, angle verification logic 2110 calculates the distance between the reference points from block 2270 and the calculated points from block 2230. At block 2274, angle verification logic 2110 determines if a minimum number of points are within threshold distance of the reference. If not, the predicted angle is set equal to the last predicted angle at block 2278. If a minimum number of points are within a threshold distance of the reference, then the predicted angle from block 2264 is confirmed by angle verification logic 2110, as indicated by block 2276. Of course, blocks 2270-2278 are illustrative of only one example of verifying the predicted angle, and there may be other ways of verifying the predicted angle as well.

Figure 25B:
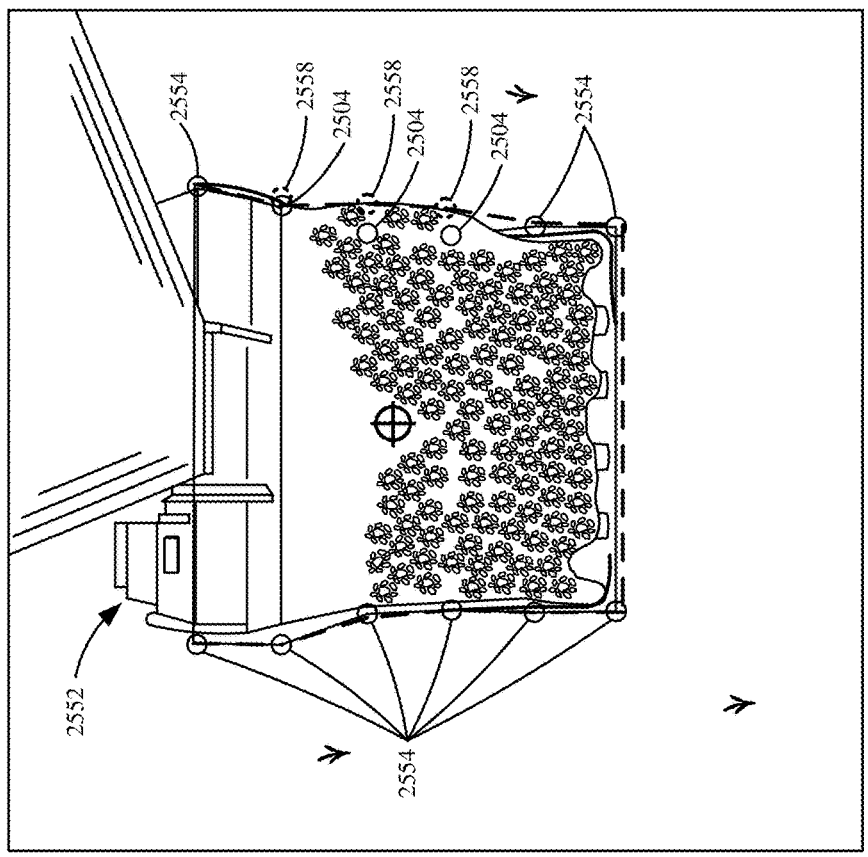
FIG. 25B illustrates one example of a point of view captured image from a 3D sensor.
Figure 25A:
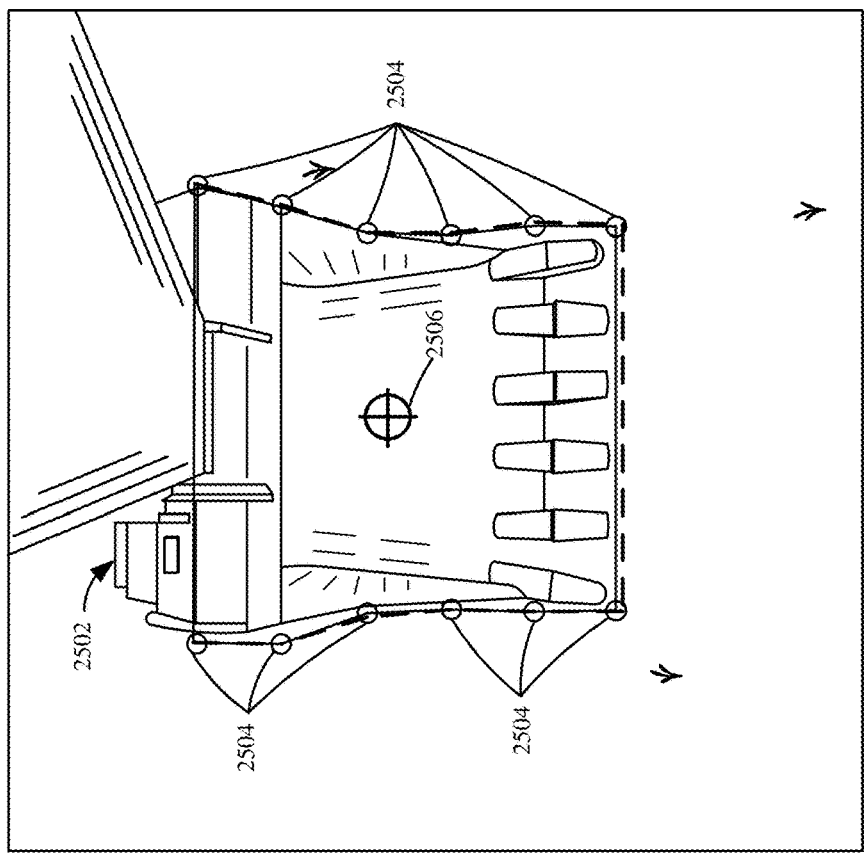
FIG. 25A illustrates one example of a point of view reference image from a 3D sensor.

One example of blocks 2270-2278 is illustrated and described in more detail with respect to FIG. 25A and FIG. 25B. FIG. 25A illustrates a reference image and FIG. 25B illustrates a captured image, for example an image captured at block 2220. At block 2270, the reference coordinates around the container perimeter are retrieved, which are illustrated in FIG. 25A as reference points 2504. At block 2272, a distance between the reference points 2504 and detected captured points 2558 is calculated. In FIG. 25B, points labeled as container points 2554 indicate that the given reference point 2504 and corresponding detected container point 2558 are within a threshold distance of each other. Points that remain labeled as reference point 2504 and container point 2558 illustrate that these points are not within a threshold distance of each other. At block 2274, it is determined whether there are a minimum number of captured points (e.g. 2554) within a threshold distance of their corresponding reference point (e.g. 2504). If there are a minimum number of captured points 2554 within the threshold distance (as opposed to mismatched points 2558) then operation 2200 proceeds at block 2276 where the angle is confirmed. If not, operation 2200 proceeds at block 2278, where the current angle is set to the last stored angle.

Turning back to FIG. 22, at block 2280, data store interaction logic 2118 stores the predicted angle in the data store 2120. At block 2282, angle generator logic 2106 outputs the (verified or last verified) predicted container angle. Output of the predicted angle can be feedback to a control system or control logic 2122, as indicated by block 2284. For example, the angle can be used to calculate the position of the container and the position is used in feedback loop control of the container. Output of the predicted angle can be to a volume determination system in place of a measured angle of the container, as indicated by block 2286. For example, the calculated angle is used in place of an angle measurement from an angle sensor. Output of the predicted angle can be to a display device for displaying to a user, as indicated by block 2288. The predicted angle can be an output for other applications as well, as indicated by block 2290.

FIG. 26 is a flowchart showing one example of an angle determination operation to obtain reference images and reference points discussed above. Operation 2600 begins at block 2610 where control logic 2122 actuates a container actuator (e.g. actuator 108) to move the container to a first extreme position. In an example, where the container is a bucket of an excavator, moving the bucket to a first extreme position can mean curling the bucket completely in towards an arm.

Operation 2600 proceeds at block 2620 where an image of the container is captured by a sensor. For example, the image can be captured by image sensor 112 of FIG. 1. Operation 2600 proceeds at block 2630 where an angle of the container is measured. The angle is illustratively an angle relative to the arm, relative to the frame, or another angle, that can be used to determine the angle of the strike plane of the bucket relative to the image capture device 112. The angle of the container can be measured manually by a user as indicated by block 2632. For example, the user measures the angle with an angle measurement tool. The angle of the container can be measured by a sensor, as indicated by block 2634. In one example, the angle sensor 114, described above, is the sensor used to measure the angle. Of course, the angle can be measured in other ways as well, as indicated by block 2636.

Operation 2600 proceeds at block 2640 where a geometric area of the container in the image is calculated. The area can be of the geometric shape defined by the perimeter of the container in the image, as indicated by block 2642. The area can be of a calculated convex hull of the points defining the container in the image, as indicated by block 2644. Of course, the area may be of a different geometric shape, as indicated by the block 2646.

Reference generator logic 2112 then identifies reference points on the image. The reference points can be identified manually, using visual markers, or automatically using image processing. Identifying the reference points is indicated by block 2648.

Operation 2600 proceeds at block 2650 where data store interaction logic 2118 stores the image as a reference image in data store 2120 in conjunction with its measured angle from block 2630 and its identified reference points and calculated area from blocks 2648 and 2640, respectively. These stored images can be retrieved later based on their metadata (e.g., area or angle, etc.).

Operation 2600 continues at block 2660 where control logic 2122 actuates an actuator coupled to the container in a given direction to move the container to a second extreme position where another reference image is to be taken. If the container is already at the second extreme position (as indicated by block 2670) then the operation is complete. If not, the operation returns to block 2620 where another reference image is taken. In one example, a reference image can be taken at each degree of movement of the bucket as it is moved from the first extreme position to a second, opposite, extreme position. In another example, a reference image may be taken after moving the bucket 2 degrees or more. Taking a reference image for each one degree of movement is just one example, and other techniques can be used as well.

Figure 27:
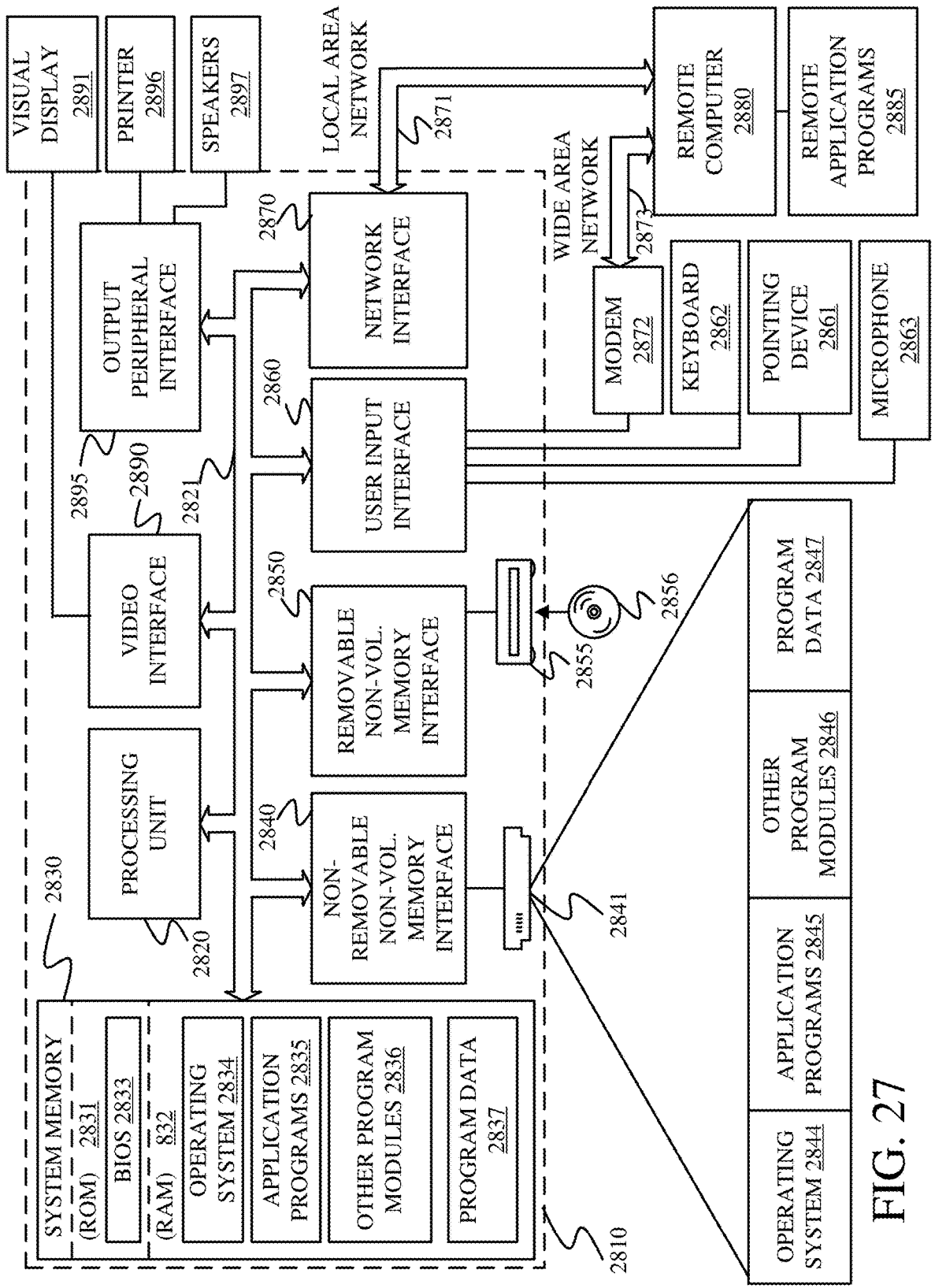
FIG. 27 is a block diagram of one example of a computing environment that can be used in the features shown in the previous figures.

FIG. 27 is one example of a computing environment in which elements of FIGS. 3-4 and 21, or parts of them, (for example) can be deployed. With reference to FIG. 27, an example system for implementing some examples includes a general-purpose computing device in the form of a computer 2810. Components of computer 2810 may include, but are not limited to, a processing unit 2820 (which can comprise processor 306 or other processors or servers), a system memory 2830, and a system bus 2821 that couples various system components including the system memory to the processing unit 2820. The system bus 2821 may be any of several types of bus structures including a memory bus or memory controller, a peripheral bus, and a local bus using any of a variety of bus architectures. Memory and programs described with respect to FIGS. 3-8 and 21 can be deployed in corresponding portions of FIG. 27.

Computer 2810 typically includes a variety of computer readable media. Computer readable media can be any available media that can be accessed by computer 2810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 2830 includes computer storage media in the form of volatile and/or nonvolatile memory such as read only memory (ROM) 2831 and random access memory (RAM) 2832. A basic input/output system 2833 (BIOS), containing the basic routines that help to transfer information between elements within computer 2810, such as during start-up, is typically stored in ROM 2831. RAM 2832 typically contains data and/or program modules that are immediately accessible to and/or presently being operated on by processing unit 2820. By way of example, and not limitation, FIG. 27 illustrates operating system 2834, application programs 2835, other program modules 2836, and program data 2837.

The computer 2810 may also include other removable/non-removable volatile/nonvolatile computer storage media. By way of example only, FIG. 27 illustrates a hard disk drive 2841 that reads from or writes to non-removable, nonvolatile magnetic media, an optical disk drive 2855, and non-volatile optical disk 2856. The hard disk drive 2841 is typically connected to the system bus 2821 through a non-removable memory interface such as interface 2840 and optical disk drive 2855 are typically connected to the system bus 2821 by a removable memory interface, such as interface 2850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 27, provide storage of computer readable instructions, data structures, program modules and other data for the computer 2810. In FIG. 27, for example, hard disk drive 2841 is illustrated as storing operating system 2844, application programs 2845, other program modules 2846, and program data 2847. Note that these components can either be the same as or different from operating system 2834, application programs 2835, other program modules 2836, and program data 2837.

A user may enter commands and information into the computer 2810 through input devices such as a keyboard 2862, a microphone 2863, and a pointing device 2861, such as a mouse, trackball or touch pad. Other input devices (not shown) may include a joystick, game pad, satellite dish, scanner, or the like. These and other input devices are often connected to the processing unit 2820 through a user input interface 2860 that is coupled to the system bus, but may be connected by other interface and bus structures. A visual display 2891 or other type of display device is also connected to the system bus 2821 via an interface, such as a video interface 2890. In addition to the monitor, computers may also include other peripheral output devices such as speakers 2897 and printer 2896, which may be connected through an output peripheral interface 2895.

The computer 2810 is operated in a networked environment using logical connections (such as a local area network—LAN, or wide area network WAN) to one or more remote computers, such as a remote computer 2880.

When used in a LAN networking environment, the computer 2810 is connected to the LAN 2871 through a network interface or adapter 2870. When used in a WAN networking environment, the computer 2810 typically includes a modem 2872 or other means for establishing communications over the WAN 2873, such as the Internet. In a networked environment, program modules may be stored in a remote memory storage device. For example, that remote application programs 2885 can reside on a remote computer.

It should also be noted that the different examples described herein can be combined in different ways. That is, parts of one or more examples can be combined with parts of one or more other examples. All of this is contemplated herein.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

Example 1 is a mobile work machine comprising:
a frame;

a ground engaging element movably supported by the frame and driven by an engine to drive movement of the mobile work machine;

a container movably supported by the frame;

an actuator configured to controllably drive movement of the container relative to the frame;

a control system configured to generate an actuator control signal, indicative of a commanded movement of the actuator, and provide the actuator control signal to the actuator to control the actuator to perform the commanded movement;

an image sensor coupled to the mobile work machine, the image sensor being configured to capture an image of the container; and an angle determination system, communicatively coupled to the control system, configured to determine an angle of the container, based on the image of the container.

Example 2 is the mobile work machine of any or all previous examples wherein the angle determination system comprises:

segmentation logic configured to identify a segment of the image that includes the container; and wherein the angle determination system is configured to determine the angle based at least in part on the segment of the image.

Example 3 is the mobile work machine of any or all previous examples wherein the angle determination system comprises:

area generator logic configured to calculate an area of the segment.

Example 4 is the mobile work machine of any or all previous examples wherein the angle determination system comprises:

angle generator logic configured to determine the angle of the container based on the area of the segment.

Example 5 is the mobile work machine of any or all previous examples wherein the segmentation logic generates a set of container perimeter coordinates based on the segment; and the angle determination system comprises:

profiling logic configured to confirm the angle from angle generator logic by comparing the set of container perimeter coordinates with a set of predetermined reference coordinates.

Example 6 is the mobile work machine of any or all previous examples wherein the angle determination system comprises:

reference generator logic configured to generate the set of predetermined reference coordinates by receiving a plurality of different reference images from the image sensor, and receiving a plurality of different reference angles, each different reference image having a corresponding different reference angle indicative of an angle of the container in the difference reference image.

Example 7 is the mobile work machine of any or all previous examples wherein the image sensor comprises at least one of a stereo camera or a laser scanner.

Example 8 is the mobile work machine of any or all previous examples further comprising:

a volume generator system, coupled to the control system, configured to determine a volume of contents in the container, based on the angle of the container and the image.

Example 9 is the mobile work machine of any or all previous examples further comprising:

display generator logic configured to display the volume of the contents in the container on a display device in a cab of the mobile work machine.

Example 10 is the mobile work machine of any or all previous examples wherein the container comprises a bucket, the mobile work machine comprises an excavator, and the contents comprise earth.

Example 11 is a method of controlling a mobile work machine, comprising:

receiving, with a control system, an operator input indicative of a commanded movement of an actuator configured to drive movement of a container movably supported by a frame of the mobile work machine;

generating, with the control system, a control signal indicative of the commanded movement;

receiving, with angle generator logic and from a 3D sensor, an image of the container of the mobile work machine; and determining, with the angle generator logic, an angle of the container with respect to the 3D sensor, based on the image.

Example 12 is the method of any or all previous examples wherein determining the angle of the container comprises:

identifying and segmenting a portion the image, the portion of the image comprising the container.

Example 13 is the method of any or all previous examples wherein determining the angle of the container comprises:

determining an area of the portion with area generator logic.

Example 14 is the method of any or all previous examples wherein determining the angle of the container comprises:

converting the area to the angle, based on a pre-determined correlation between the area and angle.

Example 15 is the method of any or all previous examples further comprising:

verifying the angle of the container, with angle verification logic, by comparing the image against a set of reference images.

Example 16 is the method of any or all previous examples wherein segmenting the portion of the image comprises, generating a convex hull.

Example 17 is a mobile work machine control system, comprising:

control logic configured to generate an actuator control signal, indicative of a commanded movement of an actuator coupled to a container of the mobile work machine to controllably drive movement of the container of the mobile work machine, and provide the actuator control signal to the actuator to control the actuator to perform the commanded movement;

a sensor configured to capture a captured image of contents in the container of the mobile work machine;

segmentation logic configured to identify a segment of the captured image comprising the container;

area generator logic configured to determine an area of the segment in the captured image; and angle generator logic, coupled to the control logic, configured to determine an angle of the container with respect to the sensor, based on the area.

Example 18 is the mobile work machine control system of any or all previous examples further comprising:

reference generator logic configured to receive a reference image of an empty container; and wherein segmentation logic identifies the container in the captured image, based on the reference image.

Example 19 is the mobile work machine control system of any or all previous examples further comprising:

angle verification logic configured to verify the angle determined by angle generator logic by comparing the captured image to the reference image, wherein a reference container angle corresponding to the reference image is known.

Example 20 is the mobile work machine control system of any or all previous examples further comprising:

volume generator logic, coupled to the control logic, configured to determine a volume of contents in the container, based on the angle and captured image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
    a frame;
    a ground engaging element movably supported by the frame and driven by an engine to drive movement of the mobile work machine;
    a container movably supported by the frame;
    an actuator configured to controllably drive movement of the container relative to the frame;
    a control system configured to generate an actuator control signal, indicative of a commanded movement of the actuator, and provide the actuator control signal to the actuator to control the actuator to perform the commanded movement;
    an image sensor coupled to the mobile work machine, the image sensor being configured to capture an image of the container;
    segmentation logic configured to identify a segment of the image that includes the container;
    area generator logic configured to calculate an area of the segment; and
    an angle determination system, communicatively coupled to the control system, configured to determine an angle of the container, based on the area of the segment.

2. The mobile work machine of claim 1, wherein the segmentation logic generates a set of container perimeter coordinates based on the segment; and wherein the angle determination system comprises:
    profiling logic configured to confirm the angle from angle generator logic by comparing the set of container perimeter coordinates with a set of predetermined reference coordinates.

3. The mobile work machine of claim 2, wherein the angle determination system comprises:
    reference generator logic configured to generate the set of predetermined reference coordinates by receiving a plurality of different reference images from the image sensor, and receiving a plurality of different reference angles, each different reference image having a corresponding different reference angle indicative of an angle of the container in the difference reference image.

4. The mobile work machine of claim 1, wherein the image sensor comprises at least one of a stereo camera or a laser scanner.

5. The mobile work machine of claim 1, further comprising:
    a volume generator system, coupled to the control system, configured to determine a volume of contents in the container, based on the angle of the container and the image.

6. The mobile work machine of claim 5, further comprising:
    display generator logic configured to display the volume of the contents in the container on a display device in a cab of the mobile work machine.

7. The mobile work machine of claim 5, wherein the container comprises a bucket, the mobile work machine comprises an excavator, and the contents comprise earth.

8. A method of controlling a mobile work machine, comprising:
    receiving, with a control system, an operator input indicative of a commanded movement of an actuator configured to drive movement of a container movably supported by a frame of the mobile work machine;
    generating, with the control system, a control signal indicative of the commanded movement;
    receiving, with angle generator logic and from a 3D sensor, an image of the container of the mobile work machine; and
    determining, with the angle generator logic, an angle of the container with respect to the 3D sensor, wherein determining the angle of the container comprises:
        identifying and segmenting a portion the image, the portion of the image comprising the container;
        determining an area of the portion with area generator logic;
        converting the area to the angle, based on a predetermined correlation between the area and angle.

9. The method of claim 8, further comprising:
    verifying the angle of the container, with angle verification logic, by comparing the image against a set of reference images.

10. The method of claim 8, wherein segmenting the portion of the image comprises, generating a convex hull.

11. A mobile work machine control system, comprising:
    control logic configured to generate an actuator control signal, indicative of a commanded movement of an actuator coupled to a container of the mobile work machine to controllably drive movement of the container of the mobile work machine, and provide the actuator control signal to the actuator to control the actuator to perform the commanded movement;
    a sensor configured to capture a captured image of contents in the container of the mobile work machine;
    reference generator logic configured to receive a reference image of an empty container;
    segmentation logic configured to identify a segment of the captured image comprising the container, wherein the segmentation logic identifies the container in the captured image, based on the reference image;
    area generator logic configured to determine an area of the segment in the captured image; and
    angle generator logic, coupled to the control logic, configured to determine an angle of the container with respect to the sensor, based on the area; and
    angle verification logic configured to verify the angle determined by angle generator logic by comparing the captured image to the reference image, wherein a reference container angle corresponding to the reference image is known.

12. The mobile work machine control system of claim 11, further comprising:
    volume generator logic, coupled to the control logic, configured to determine a volume of contents in the container, based on the angle and captured image.

* * * * *